United States Patent
Nishimura et al.

(10) Patent No.: US 6,473,432 B1
(45) Date of Patent: Oct. 29, 2002

(54) BUFFER CONTROL APPARATUS AND METHOD

(75) Inventors: Kazuto Nishimura; Takaaki Wakisaka; Masato Okuda; Jun Tanaka; Tomohiro Ishihara, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/023,962

(22) Filed: Feb. 13, 1998

(30) Foreign Application Priority Data

Jul. 14, 1997 (JP) ............................................. 9-188707

(51) Int. Cl.[7] .......................... H04L 12/28; H04L 12/50
(52) U.S. Cl. ...................................... 370/412; 370/419
(58) Field of Search ................................ 370/351, 352, 370/355, 356, 359, 360, 363, 368, 412, 419

(56) References Cited

U.S. PATENT DOCUMENTS

| | | | | |
|---|---|---|---|---|
| 5,079,762 A | * | 1/1992 | Tanabe | 370/60 |
| 5,392,443 A | * | 2/1995 | Sakakibara et al. | 395/800 |
| 5,440,547 A | * | 8/1995 | Easki et al. | 370/60 |
| 5,500,851 A | * | 3/1996 | Kozaki et al. | 370/13 |
| 5,555,265 A | * | 9/1996 | Kakuma et al. | 370/60 |
| 5,732,087 A | * | 3/1998 | Lauer et al. | 370/416 |
| 5,742,600 A | * | 4/1998 | Nishihara | 370/395 |
| 5,859,846 A | * | 1/1999 | Kim et al. | 370/389 |
| 6,009,078 A | * | 12/1999 | Sato | 370/232 |
| 6,046,983 A | * | 4/2000 | Hasegawa et al. | 370/232 |

FOREIGN PATENT DOCUMENTS

| | | |
|---|---|---|
| EP | 0690596 A1 | 1/1996 |
| JP | 8149141 | 6/1996 |
| JP | 918494 | 1/1997 |

OTHER PUBLICATIONS

A Multi–Functional Large–Scale ATM Switch Architecture, Masahiro Takatori et al., Proceedings of the International Switching Symposium, De Berlin, VDE Verlag, vol. Symp. 15, pp. 489–493.

A Multi–Queue Flexible Buffer Manager Architecture, R. Velamuri et al., Proceedings of the Global Telecommunications Conference, US, IEEE, pp. 1401–1405.

Queueing Disciplines For Integrated Fast Packet Networks, M. Hluchyj et al ., Proceedings of the International Conference on Communications, U.S., IEEE, vol. 14, pp. 990–996, Jun. 14, 1992.

(List continued on next page.)

*Primary Examiner*—Alpus H. Hsu
*Assistant Examiner*—Toan Nguyen
(74) *Attorney, Agent, or Firm*—Katten Muchin Zavis Rosenman

(57) ABSTRACT

The present invention relates to a buffer control apparatus and method. In a buffer control apparatus for controlling storage process for a common buffer which is commonly used for a plurality of routes and temporarily stores data received from the routes, the buffer control apparatus comprises a route discriminating section for identifying the routes of the received data; a storage section for storing at least information concerning a storing position for the received data within the common buffer for each of the routes; and a control section for performing a control operation for virtually storing, route by route, the received data into the common buffer according to a result of route identification in the route discriminating section and the information concerning the storing position in the storage section, whereby the storage control in the common buffer is performed such that the common buffer can be virtually used as discrete buffers, in order to secure minimum band for each of the routes without increasing the capacity of the buffer and complicating the readout control for the buffer.

20 Claims, 35 Drawing Sheets

OTHER PUBLICATIONS

Methodologies For Bandwidth Allocation, Transmission Scheduling, and Congestion Avoidance in Broadband ATM Networks, Computer Networks and ISDN Systems, NL, North Holland Publishing, Amsterdam, vol. 26, No. 1, Sep. 1, 1993, pp. 43–59.

A Multi–Functional Large–Scale ATM Switch Architecture XP–000495619 Publication Date: Apr. 23, 1995.

A Multi–Queue Flexible Buffer Manager Architecture XP–000436048 Publication Date: Nov. 29, 1993.

* cited by examiner

BUFFER CONTROL APPARATUS AND METHOD

BACKGROUND OF THE INVENTION (1) Field of the Invention

This invention relates to a buffer control apparatus and method and, in particular, to a buffer control apparatus and method favorably applicable to a buffering portion of fixed-length data (ATM cell) treated in an ATM (Asynchronous Transfer Mode) communication system.

(2) Description of the Related Art

ATM communication systems can perform communications while setting different bands according kinds (applications) of the communications such as data communications, telephone communications, and the like. For example, it is necessary to set a band on the order of several Mbps to several ten Mbps for transmitting dynamic image information in data communications and a band on the order of 64 kbps for transmitting sound information in telephone communications. In ATM communication systems, statistical multiplexing at ATM cell level is performed in ATM communication apparatus such as ATM switch and cell concentrator in ATM communication networks, whereby the communications in these various bands are accommodated with a high efficiency, thus allowing the bands to be effectively utilized.

Meanwhile, as is well known, the above-mentioned ATM switch and cell concentrator perform control for distributing input cells into desired transfer destinations according to the cell transfer destination information stored at the header portion of each ATM cell. Here, performed in order to prevent the cells having the same transfer destination information from colliding with each other upon being distributed is cell conflict control in which a buffer is used for temporarily accumulating the input cells so as to output the cells as slightly shifting from each other.

For example, as shown in FIG. 36, in an ATM switch 100, ATM cells from a plurality of subscribers' terminals accommodated in the switch 100 are multiplexed in a multiplexing section 101 and then are temporarily accumulated in a common buffer (FIFO: First In First Out) 102 so as to adjust the output timing of each cell, before being distributed by a demultiplexing section 103.

In the ATM switch 100 of this type using the common buffer 102, however, when a certain subscriber's terminal transmits a large amount of data (ATM cells), a major part of the storage capacity of the common buffer 102 may be occupied by the data from this subscriber's terminal, thereby extremely reducing the band that can be utilized by the other subscribers' terminals.

In order to overcome this problem, bands may be secured for respective terminals or respective kinds of communications. Nevertheless, in data communications with a strong burst characteristic, idle bands not in use increase so that the secured bands may not effectively be utilized. Therefore proposed is a discrete buffer system which basically does not secure bands for respective communications but only guarantees bands which are supposed to be minimally required.

FIG. 37 is a block diagram for explaining this discrete buffer system. As shown in this diagram, an ATM switch 100' comprises not only the multiplexing section 101 and demultiplexing section 103 similar to those shown in FIG. 36, but also discrete buffers 104 provided for respective input routes [e.g., VPs (Virtual Paths)/VCs (Virtual Channels) of the ATM cells] and, as a buffer control apparatus for controlling the writing/reading processing of ATM cells with respect to the discrete buffers 104, a route (channel) discriminating section 105 and a readout control section 106.

Here, the channel discriminating section 105 identifies, from the header portion of the arriving cell, the route (VP/VC) of this cell so as to distribute it to its appropriate discrete buffer 104. The readout control section 106 polls each discrete buffer 104 at a predetermined period, thereby sequentially reading out the cells stored in the respective discrete buffers 104.

As a result of the foregoing configuration, in the ATM switch 100' (buffer control apparatus), the arriving cells are successively stored in the discrete buffers 104 for the respective input routes, and then the readout control section 106 reads out the cells one by one from all the discrete buffers 104. Consequently, for example, assuming that the number of input routes is X (the total number of the discrete buffers 104 is X; where X is a natural number not smaller than 2), and the output channel band is V, the readout control section 106 would poll each discrete buffer 104 once in X times, thereby securing a band of at least V/X.

In order to attain a performance (maximum permissible band) on the same order as that of the common buffer system in such buffer control apparatus (discrete buffer system), it is necessary to greatly increase the storage capacity of each discrete buffer 104 or speed up the readout control performed by the readout control section 106. In either case, however, the size of the apparatus increases, or the control becomes complicated.

SUMMARY OF THE INVENTION

In view of such problems, it is an object of the present invention to provide a buffer control apparatus and buffer control method in which storage control of a common buffer is performed such that the common buffer can be virtually used as discrete buffers, thus allowing a minimum band to be secured without increasing the buffer capacity or complicating the readout control with respect to the buffer.

Therefore, the present invention provides a buffer control apparatus for controlling storage process for a common buffer which is commonly used for a plurality of routes and temporarily stores data received from the routes, the buffer control apparatus comprising a route discriminating section for identifying the routes of the received data, a storage section for storing at least information concerning a storing position for the received data within the common buffer for each of the routes, and a control section for performing a control operation for virtually storing, route by route, the received data into the common buffer according to a result of route identification in the route discriminating section and the information concerning the storing position in the storage section.

Also, the present invention provides a buffer control method for controlling storage in a common buffer which is commonly used for a plurality of routes and temporarily stores data received from the routes, the method comprising the step of virtually storing, route by route, the received data into the common buffer.

Accordingly, in the buffer control apparatus and method of the present invention, since the common buffer can be virtually used as discrete buffers respectively provided for individual routes, a predetermined buffering can be easily realized for all the routes, whereby a minimally required band can be certainly secured for each route without increasing the buffer capacity.

DESCRIPTION OF THE PREFERRED EMBODIMENTS (a) Explanation of Aspect of Present Invention First, an aspect of the present invention will be explained with reference to the accompanying drawings.

Figure 1:
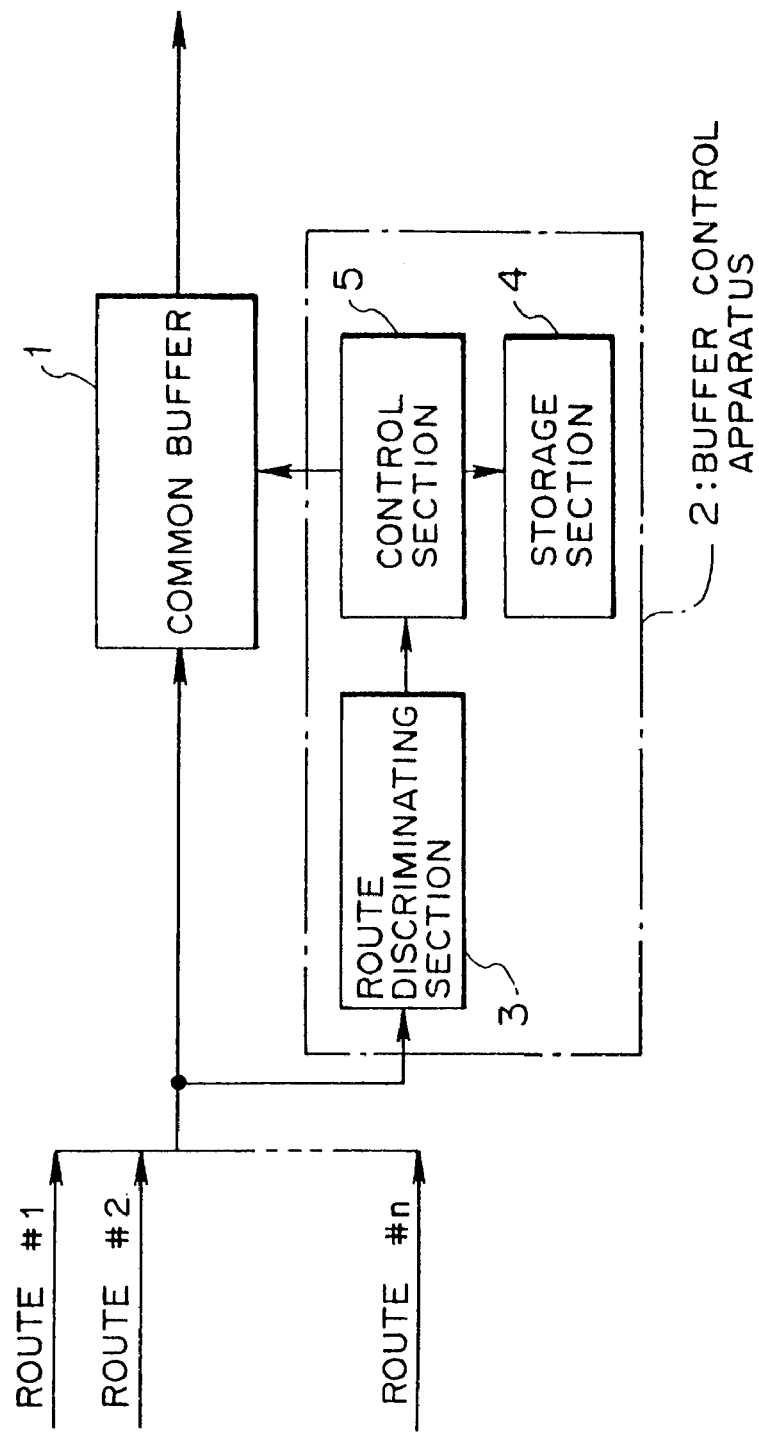
FIG. 1 is a block diagram showing an aspect of the present invention.

FIG. 1 is a block diagram showing the aspect of the present invention. In this drawing, "1" refers to a common buffer which is commonly used for a plurality of routes #1 to #n (n being a natural number not smaller than 2) and temporarily stores data received from the routes #1 to #n, whereas "2" refers to a buffer control apparatus for controlling storage process for the common buffer 1. Further, as shown in FIG. 1, the buffer control apparatus 2 comprises a route discriminating section 3, a storage section 4, and a control section 5.

The route discriminating section 3 identifies the routes #1 to #n of the received data. The storage section 4 stores, at least, information concerning the storing position for the above-mentioned data within the common buffer 1 for each route #i (wherein i=1 to n). The control section 5 performs a control operation for virtually storing, for each route #i, the received data into the common buffer 1 according to a result of route identification in the route discriminating section 3 and the information concerning the storing position in the storage section 4.

In thus configured buffer control apparatus 2 of the present invention, the route #i of the received data is identified by the route discriminating section 3; and based on the result of this identification and the information concerning the storing position for the received data within the common buffer 1 stored in the storage section 4, the control section 5 performs a control operation for virtually storing, for each route #1, the received data into the common buffer 1. Consequently, the data received from the plurality of routes #i are virtually stored in the common buffer 1 for the respective routes #i.

Thus, according to the buffer control apparatus 2 (buffer control method) of the present invention, data received from a plurality of routes #i can be virtually stored in the common buffer 1 for the respective routes #i, whereby the common buffer 1 can be virtually used as discrete buffers provided for the respective routes #i. Accordingly, a predetermined buffering can easily be realized for all the routes #i, whereby the minimally required band can certainly be secured for each route #i without increasing the buffer capacity.

Specifically, the storage section 4 comprises, for example, a link memory for storing, for each route #i, a series of address information of the received data within the common buffer 1 as being successively linked in the order of received data; a per-route information memory for storing, for each route #i, the address information of the received data initially stored in the common buffer 1, the address information of the received data lastly stored in the common buffer 1, and the amount of received data; and an empty address information memory for storing empty address information within the common buffer 1.

In this case, according to the result of route identification in the route discriminating section 3 and the empty address information in the empty address information memory, the control section 5 causes the received data to be stored at a predetermined empty address in the common buffer 1 and, based on this empty address, updates each of the linking state in the link memory, the address information and the amount of received data in the per-route information memory, and the empty address information in the empty address information memory.

Consequently, while constantly comprehending from which route #i and to which address within the common buffer 1 the received data are stored, and how much the received data from which route #i are stored in the common buffer 1, the control section 5 causes the received data to be stored in the common buffer 1, whereby, in the common buffer 1, the data received from a plurality of routes #i attain a state where they are virtually stored for the respective routes #i.

Accordingly, the data received from a plurality of routes #i can be caused to attain a state where they are securely stored for the respective routes #i within the common buffer 1.

The buffer control apparatus 2 may comprise a threshold storing section for storing a threshold value concerning a congested state in the common buffer 1. In this case, for example, the control section 5 comprises a congested state detecting section for detecting a congested state of the common buffer 1 according to the threshold value of the threshold storing section, and a storage processing restricting section which can restrain, for each route #i, the received data from being stored into the common buffer 1 when the congested state detecting section detects a congested state.

As a result of this configuration, when a congested state occurs in the common buffer 1, the control section 5 restrains, for each route #i, the received data from being stored into the common buffer 1, whereby the data received from a part of the routes #i can be prevented from being stored into the common buffer 1 by an amount extremely greater than those from the other routes #i.

Accordingly, at least a certain band can be secured for each of all the routes #i.

The threshold storing section may comprise a total data amount threshold storing section for storing a total data amount threshold value concerning the total data amount within the common buffer 1, and a minimally-guaranteed threshold storing section for storing a minimally-guaranteed threshold value for an amount of data to be minimally guaranteed for each route #i within the common buffer 1. In this case, the congested state detecting section comprises a total data amount evaluating section for judging whether the total data amount within the common buffer 1 exceeds the total data amount threshold value or not, and is configured so as to detect the congested state when the total data amount evaluating section judges the total data amount within the common buffer 1 to be higher than the total data amount threshold value. Further, the storage processing restricting section comprises a per-route data amount evaluating section for judging, when the congested state detecting section detects a congested state, whether or not there exists within the common buffer 1 a route #i whose per-route data amount exceeds the above-mentioned minimally guaranteed threshold value; and is configured to restrain, when the per-route data amount evaluating section judges that there is a route #i exceeding the above-mentioned minimally guaranteed threshold value, new received data from being stored into the common buffer 1 for this route #i.

As a result of this configuration, when the total data amount within the common buffer 1 exceeds a predetermined amount so that the common buffer 1 attains a congested state, the storage processing restricting section can restrain new received data from being stored into the common buffer 1 for the route #i in which the data amount to be minimally guaranteed is exceeded within the common buffer 1. Thus can more securely be prevented from occurring is a phenomenon in which the data received from a certain route #1 are stored within the common buffer 1 by a large amount while the bands of the other routes #i are not secured.

Accordingly, the minimum band can more securely be guaranteed for all the routes #i.

Also, the threshold storing section may comprise an active route number threshold storing section for storing an active route number threshold value concerning the number of routes #i in an active state receiving data, and a minimally-guaranteed threshold storing section for storing a minimally-guaranteed threshold value for an amount of data to be minimally guaranteed for each route #1 within the common buffer 1. In this case, the congested state detecting section comprises an active route number evaluating section for judging whether the number of routes in the active state exceeds the active route number threshold value or not, and is configured so as to detect the congested state when the active route number evaluating section judges the number of routes in the active state to be higher than the active route number threshold value. Further, the storage processing restricting section comprises a per-route data amount evaluating section for judging, when the congested state detecting section detects the congested state, whether or not there exists within the common buffer 1 a route #i whose per-route data amount exceeds the above-mentioned minimally guaranteed threshold value; and is configured to restrain, when the per-route data amount evaluating section judges that there is a route #i exceeding the above-mentioned minimally guaranteed threshold value, new received data from being stored into the common buffer 1 for this route #i.

As a result of this configuration, when the number of routes #i in the active state in which data have arrived at the common buffer 1 exceeds a predetermined number so that the common buffer 1 attains a congested state, the storage processing restricting section can restrain new received data from being stored into the common buffer 1 for the route #i in which the data amount to be minimally guaranteed is exceeded within the common buffer 1. Thus can more easily be prevented from occurring is a phenomenon in which the data received from a certain route #1 are stored within the common buffer 1 by a large amount while the bands of the other routes #i are not secured.

Accordingly, the minimum band can easily be guaranteed for all the routes.

The storage processing restricting section may be configured such that, even when the congested state detecting section detects a congested state whereby new received data are restrained from being stored into the common buffer 1 for a certain route #i, dependent data which form a single data together with the received data of the route #i already stored in the common buffer 1 are allowed to be stored into the common buffer 1.

As a result of this configuration, even when new received data are restrained from being stored into the common buffer 1 for a certain route #1, in the case where a part of a plurality of data forming a single data has already been stored in the common buffer 1, the storage processing restricting section can cause the remaining data (dependent data) to be stored into the common buffer 1, thus preventing a part of data to be treated as a single data from dropping off.

Accordingly, this storage processing restricting section greatly contributes to improving the reliability of buffering.

The control section 5 may comprise a readout control section for reading out the received data virtually stored in the common buffer 1 for the respective routes #i according to the information concerning the storing position in the storing section 4. Consequently, the buffer control apparatus 2 can read out, for the respective routes #i, the received data virtually stored in the common buffer 1 for the respective routes #i.

Accordingly, without complicating the readout mechanism for the common buffer 1, the received data can be read out quite easily, for the respective routes #i, from the common buffer 1.

The readout control section may be configured so as to read out the received data for each route #i at a predetermined period, thus allowing all the routes #i to minimally secure a constant band, whereby a required band can be evenly allocated to each route #i.

Also, the readout control section may be configured so as to comprise a retrieving section for retrieving a route #i of the received data to be read out from the common buffer 1, while this retrieving section skips retrieving for the routes #i in which the received data to be read out do not exist. As a result of this configuration, the readout control section does not read out unnecessary data from the routes #i where no received data to be read out exist. Consequently, a wider band can be secured for each route #i.

The retrieving section may comprise a group retrieving section for dividing the routes #i into a plurality of groups and retrieving a group in which the received data to be read out from the common buffer 1 exist, and a route retrieving section for retrieving a route #i of the received data to be read out from the common buffer 1 within the group retrieved by the group retrieving section.

As a result of this configuration, when retrieving the route #i of the received data to be read out from the common buffer 1, the retrieving section divides the routes #i into a plurality of groups, retrieves the group including the route #i in which the received data exist, and then retrieves the route #i of the received data within thus retrieved group, whereby it can hierarchically retrieve the route #i in which the received data to be read out exist.

Consequently, the number of processing operations required for retrieving the route #i in which the received data to be read out exist can be greatly reduced, thus extremely contributing to speeding up the readout control and cutting down the power consumption.

The storage section 4 may comprise a first readout data amount setting section for setting a first readout data amount to be read out from the common buffer 1 for each route #i, while the readout control section may be configured so as to read out the received data from the common buffer 1 for each route #i according to each first readout data amount of the first readout data amount setting section.

As a result of this configuration, the readout control section can read out the received data from the common buffer 1 by a predetermined amount for each route #i according to each first readout data amount of the first readout data amount setting section, whereby the minimally guaranteed band allocated to each route #i can be made variable for each route #i.

Consequently, the minimum band can be secured more flexibly.

Further, after performing the readout control for all the routes according to the respective first readout data amounts in the first readout data amount setting section in the storage section 4, the readout control section may cyclically read out the received data from the common buffer 1 by a constant data amount for each route #i.

As a result of this configuration, after reading out the received data stored in the common buffer 1 by a predetermined amount for each route #i, the readout control section can evenly read out the received data from the common buffer 1 by a constant data amount for each route #i, whereby the excess part of band remaining after the minimally guaranteed band allocation to each route #i can be evenly allocated to the routes #i.

The storage section 4 may comprise a second readout data amount setting section for setting a second readout data amount to be read out from the common buffer 1 for each route #i such that the a sum of second readout data amount and the first readout data amount becomes identical in all the routes #i; whereas, after performing the readout control of the received data from the common buffer 1 for all the routes #i according to the respective first readout data amount of the first readout data amount setting section, the readout control section may read out the received data from the common buffer 1 for each route #i according to each second readout data amount of the second readout data amount setting section.

As a result of this configuration, after reading out the received data stored in the common buffer 1 by a predetermined amount for each route #i, the readout control section can further read out the received data from the common buffer 1 by a predetermined amount for each route #i such that an identical total readout data amount for each route #i can be attained throughout the routes #i.

Consequently, the excess part of band remaining after the minimally guaranteed band allocation to each route #i can be allocated to the routes #i such that the same bandwidth is allocated to each route #i, whereby the whole output band of the common buffer 1 can be evenly allocated to all the routes #i.

Further, the readout control section may comprise a timer for outputting a data readout timing at a predetermined interval for each first setting data amount in the first readout data amount setting section, while the received data corresponding to each first readout data amount of the first readout data amount setting section may be read out from the common buffer 1 for each route #i according to the timing of this timer.

As a result of this configuration, according to the operation of the timer, the readout control section can read out the received data to be read out by the predetermined amount at predetermined intervals, whereby the burst characteristic of the received data read out for each route #i can be alleviated.

The storage section 4 may comprise a scheduling table for defining a data readout interval for each first readout data amount in the first readout data amount setting section, while the readout control section may read out, according to this scheduling table, the received data from the common buffer 1 for each route #i by each first readout data amount of the first readout data amount setting section.

As a result of this configuration, when reading out the received data from the common buffer 1 by a predetermined amount for each route #i, the readout control section can read out the received data for each route #i according to the readout interval defined by the scheduling table. Accordingly, also in this case, the burst characteristic of the received data read out for each route #i can be alleviated.

Since the first readout data amount of the first readout data amount setting section may be set externally, the data amount to be read out at once from the common buffer 1 maybe arbitrarily changed for each route #i so as to alter the band to be allocated to each route #i. Accordingly, the minimum band can be secured for each route #i more flexibly.

Further, the readout control section may comprise a band allocation control section for dividing the routes #i into a plurality of groups and performing readout control of the received data of the common buffer 1 for each group so as to control a band to be allocated to each group, such that the band to be allocated to each route #i can be set group by group.

As a result of this configuration, the readout control section can set, group by group, the band to be allocated to each route #i, whereby the same band can be allocated to a plurality of routes #i upon a single setting operation.

Accordingly, the burden on the band allocation control of each route #i can be greatly reduced.

The storage section 4 may comprise a group table in which route dividing information for dividing the routes #i into a plurality of groups is set, while the readout control section may perform readout control of the received data with respect to the common buffer 1 for each desired group according to the route dividing information of the group table.

As a result of this configuration, since the readout control section performs readout control of the received data with respect to the common buffer 1 for each given group divided according to the route dividing information, it can flexibly change the route configuration in the group by setting the route dividing information, so as to allow the readout control of the received data to be performed for each such group, whereby a group sharing the same band can be formed quite flexibly.

The readout control section may be configured so as to give a higher priority to the received data read out from the common buffer 1 according to the first readout data amount of the fist readout data amount setting section than the other received data.

As a result of this configuration, the readout control section can give a higher priority to the received data read out from the common buffer 1 according to the first readout data amount, i.e., the received data corresponding to the part of band to be minimally guaranteed, so as to prevent them from being discarded during processing, and so forth. Accordingly, this readout control section can greatly contribute to improving the reliability of the minimum band securing control.

Here, in the case where the received data to which the priority is to be given is a leading data accompanying a dependent data, the priority may also be given to the dependent data. As a result, the dependent data to form a single data together with the leading data can be prevented from being erroneously discarded, whereby the reliability at the time of data communications can be greatly improved. Also, since the same priority can be given to both the leading data and dependent data forming the same data, priority/non-priority control of the received data read out from the common buffer 1 can be performed quite efficiently per data formed by the leading data and dependent data.

The readout control section may comprise an average received data amount detecting section for detecting an average value of the received data amount for each route #i, a comparing section for comparing the average value detected by the average received data amount detecting section and corresponding first readout data amount of the first readout data amount setting section with each other, and a priority data amount calculating section for calculating, of the first readout data amount, an amount of priority data to have a priority higher than that of the other data; so as to give, of the received data read out from the common buffer 1, according to a result of the calculation in the priority data amount calculating section, a priority to the received data corresponding to the priority data amount, when the comparing section judges the above-mentioned average value to be greater than the above-mentioned first readout data amount.

As a result of this configuration, the readout control section can give, of the received data amount read out by the predetermined amount, a higher processing priority to the received data corresponding to the minimally guaranteed band, thus greatly contributing to improving the reliability on the minimum band guarantee control in this case as well.

Further, the readout control section may comprise a leading data discriminating section for judging whether or not the received data to which the priority is given is a leading data accompanying a dependent data, while, when the leading data discriminating section judges the received data to be a leading data to which the priority is to be given, the priority is given to the dependent data as well.

As a result of this configuration, the readout control section can set the same value of processing priority for each received data within a single data formed by the leading data and dependent data, whereby the dependent data to form a single data together with the leading data can be prevented from being erroneously discarded in this case as well. Consequently, also in this case, the reliability at the time of data communications can be greatly improved, while the priority for the received data read out from the common buffer 1 can be efficiently set per data formed by the leading data and dependent data.

(b) Explanation of Embodiment of Present Invention

In the following, an embodiment of the present invention will be explained with reference to the accompanying drawings.

Figure 2:
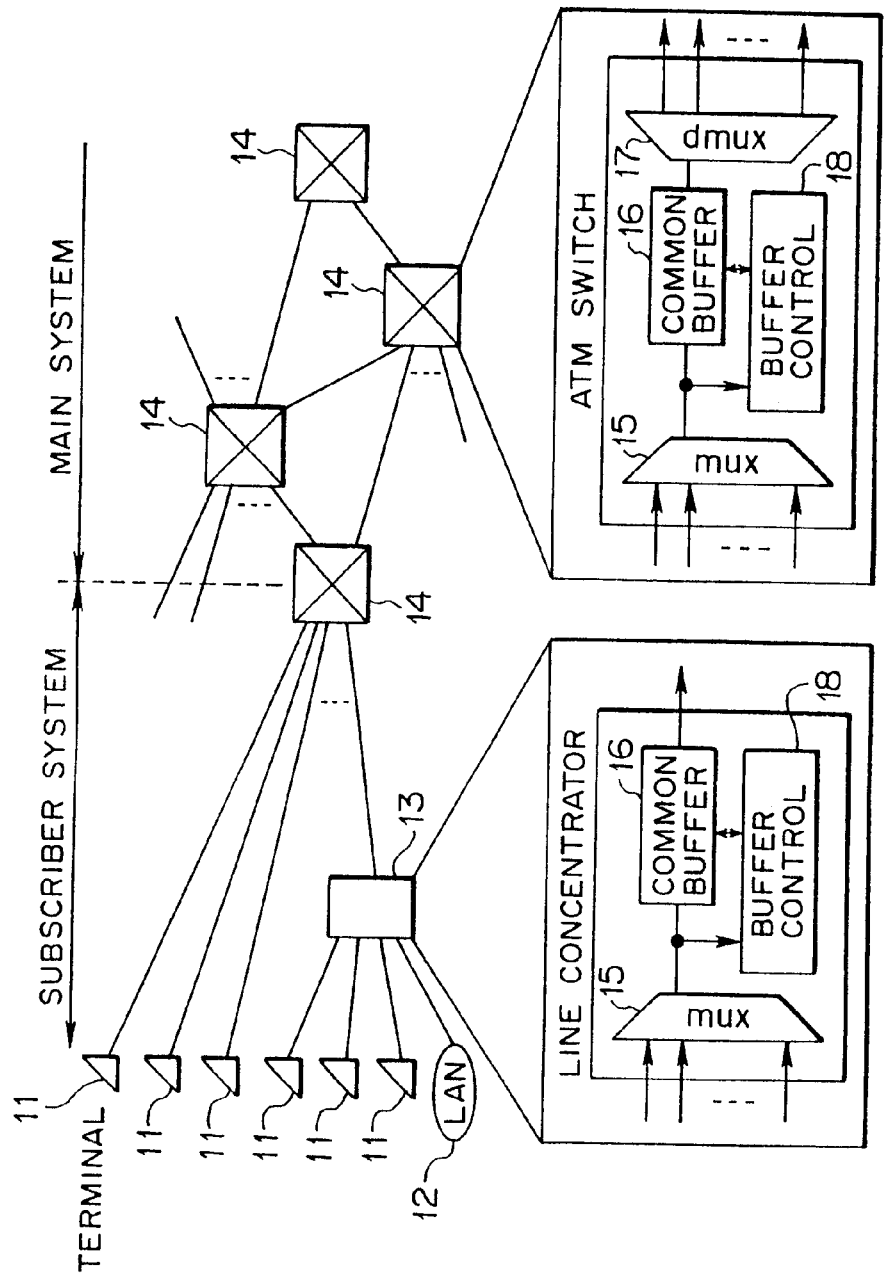
FIG. 2 is a block diagram showing an example of ATM communication network to which a buffer control apparatus as an embodiment of the present invention is applied.

FIG. 2 is a block diagram showing an example of ATM communication network to which a buffer control apparatus as an embodiment of the present invention is applied. Depicted in this drawing are individual subscribers' terminals 11, a LAN (Local Area Network) 12, a line concentrator 13, and ATM switches 14. ATM cells sent from individual subscribers' terminal 11 or LAN 12 are subjected to a multiplexing processing in the line concentrator 13, and then are subjected to a demultiplexing (switching) processing in the ATM switch 14 so as to be transmitted to their desired transfer destinations.

For this purpose, the line concentrator 13 basically comprises a multiplexing section (mux) 15 for multiplexing ATM cells from a plurality of routes such as individual subscribers' terminals 11 or LAN 12, and a common buffer 16 for temporarily storing, in common for each route, the cells thus multiplexed by the multiplexing section 15. The ATM switch 14 comprises, not only the multiplexing section 15 and common buffer 16 similar to those in the line concentrator 13, but also a demultiplexing section (demux) 17 for demultiplexing the cells multiplexed by the multiplexing section 15.

Figure 3:
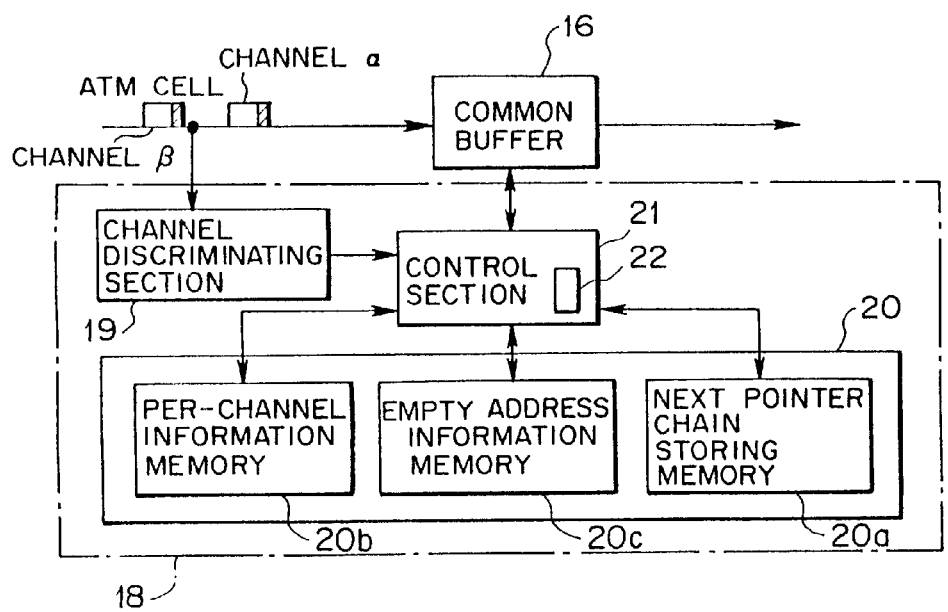
FIG. 3 is a block diagram showing a configuration of the buffer control apparatus in the above-mentioned embodiment.

In this embodiment, a buffer control apparatus 18 for controlling storage process for the common buffer 16 is disposed at each place where the common buffer 16 is provided as mentioned above. Further, as shown in FIG. 3, each buffer control apparatus 18 comprises a route (channel) discriminating section 19, a storage section 20, and a control section 21.

The channel discriminating section 19 identifies the route ($\alpha$, $\beta$, or the like) of an ATM cell as the arriving received data. In this embodiment, by reading out VPI/VCI stored in the header portion of the ATM cell, the channel discriminating section 19 identifies VP/VC (channel) as the above-mentioned route.

The storage section 20 stores, at least, information concerning the storing positions of the received ATM cells within the common buffer 16 per the above-mentioned channel (VP/VC). In this embodiment, as shown in FIG. 3, the storage section 20 comprises a next pointer chain storing memory 20a, a per-channel address information memory 20b, and an empty address information memory 20c.

Figure 4:
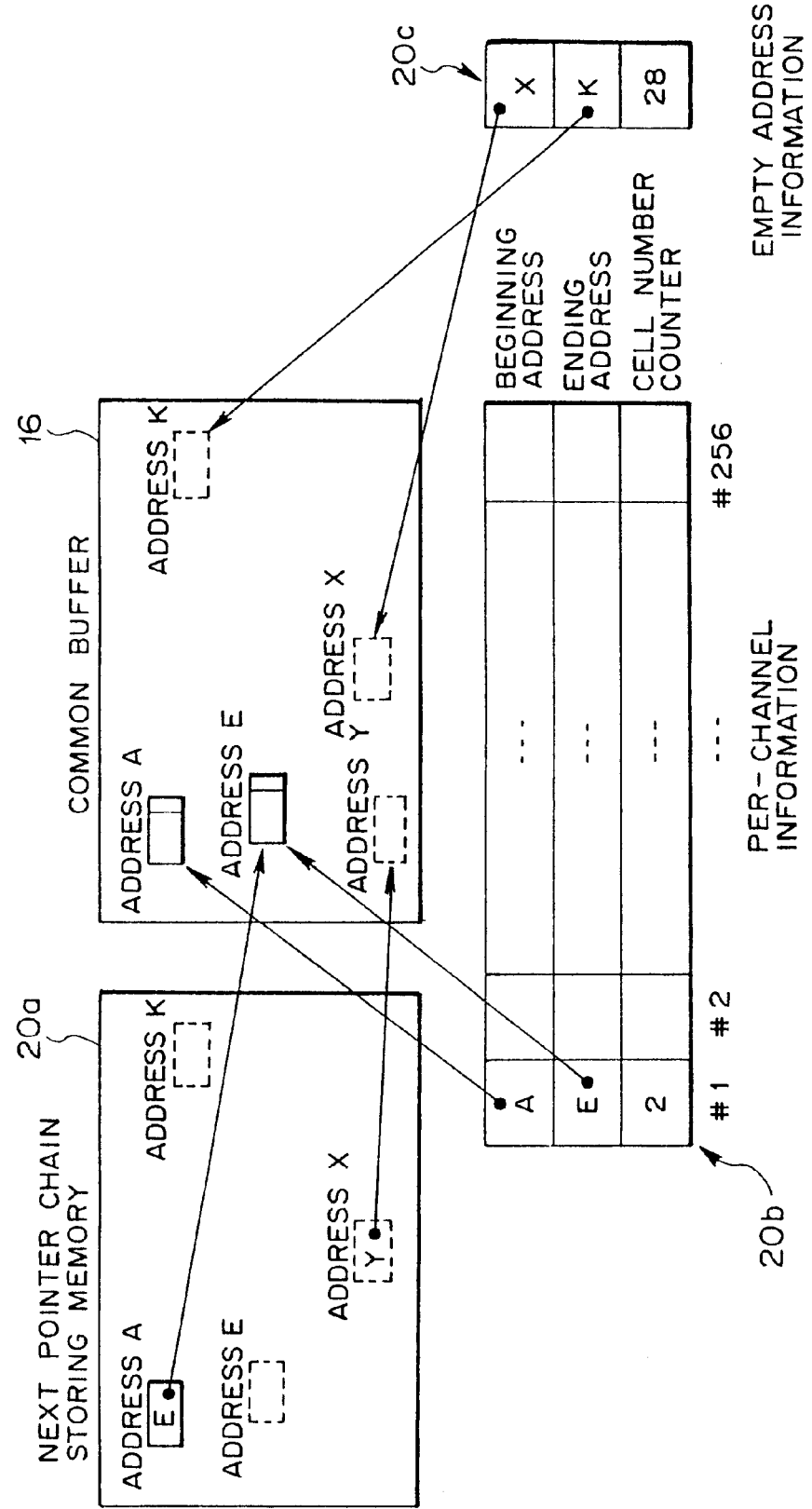
FIG. 4 is a view schematically showing configurations of a next pointer chain storage memory, per-channel information memory, and empty address information memory in the buffer control apparatus in the above-mentioned embodiment.

The next pointer chain storing memory (link memory) 20a stores, per channel, a series of address information of the received ATM cells within the common buffer 16 as being successively linked in the order of storage of ATM cells. Here, as shown in FIG. 4, it has the same address field as that of the common buffer 16. For example, when ATM cells of a certain channel are stored in the common buffer 16 in the order of address A to address E, stored is a pointer indicating that the storing position of the ATM cell stored next to the own address A is address E, thereby forming a pointer chain (link) per channel.

Here, in this embodiment, a per-channel pointer chain is formed not only for the addresses of the ATM cells stored within the common buffer 16 but also for empty addresses within the common buffer 16.

Further, as shown in FIG. 4, the per-channel information memory 20b stores, for each channel, the address information (leading address) of the ATM cell initially stored in the common buffer 16, the address information (ending address) of the ATM cell lastly stored in the common buffer 16, and the number of ATM cells (cell number counter value) as the received data amount.

The empty address information memory 20c stores empty address information within the common buffer 16. In this case, as shown in FIG. 4, the empty address information memory 20c can store the leading/ending empty address and the number of empty addresses within the common buffer 16.

According to the result of channel identification in the channel discriminating section 19 and the information concerning the storing positions for ATM cells within the common buffer 16 stored in the storage section 20, the control section 21 performs a control operation for virtually storing the received ATM cells into the common buffer 16 channel by channel. On the other hand, according to the information concerning the storing positions for ATM cells within the common buffer 16 stored in the storage section 20, it performs a control operation for reading out the ATM cells stored within the common buffer 16. As shown in FIG. 3, it has a readout control section 22.

Specifically, in this embodiment, the control section 21 causes the received ATM cell to be stored at a predetermined empty address in the common buffer 16 according to the result of channel identification in the channel discriminating section 19 and the empty address information in the empty address information memory 20c; and, according to this empty address, updates each of the address linking state of the next pointer chain storing memory 20a, address information and cell number counter value in the per-channel information memory 20b, and empty address information in the empty address information memory 20c.

For example, in FIG. 4, when a cell of channel #1 arrives, the control section 21 initially refers to the leading address of the empty address information memory 20c. Since the leading address is X now, the control section 21 stores the arriving cell at address X in the common buffer 16. Then, since the address indicated by the pointer stored at address X in the next pointer chain storing memory 20a is address Y, the control section 21 updates the leading address X of the empty address information memory 20c to address Y, updates the ending address E for channel #1 in the per-channel information memory 20b to address X, and stores the pointer indicating address X at address E of the next pointer chain storing memory 20a.

With reference to the leading address in the per-channel information memory 20b, the readout control section 22 extracts a cell from its corresponding address in the common buffer 16; and, according to the address of thus extracted cell, updates each of the address linking state of the next pointer chain storing memory 20a, address information and cell number counter value in the per-channel information memory 20b, and empty address information in the empty address information memory 20c.

For example, in FIG. 4, when a cell is sent from channel #1, the readout control section 22 refers to the leading address of the per-channel information memory 20b for channel #1. Since the leading address is address A now, the readout control section 22 sends out the cell stored at address A which is the leading address within the common buffer 16. Then, the readout control section 22 updates the leading address X of the per-channel information memory 20b to address E indicated by the pointer stored at address A in the next pointer chain storing memory 20a, updates the ending address K in the empty address information memory 20c to address A, and stores the pointer indicating address A at address K in the next pointer chain storing memory 20a.

Namely, by storing ATM cells into the common buffer 16 while constantly comprehending from which channel and to which address within the common buffer 16 the received ATM cells are stored and how much received ATM cells are stored in the common buffer 16 from which channel, the control section 21 can virtually store, channel by channel, ATM cells received from a plurality of channels into the common buffer 16, while allowing its readout control to be easily performed.

Meanwhile, in this embodiment, when the common buffer 16 attains a congested state, the control section 21 refers to the cell number per channel and, for the channel in which the cell number exceeds the number to be minimally guaranteed, restrains the cells from being newly stored.

Figure 5:
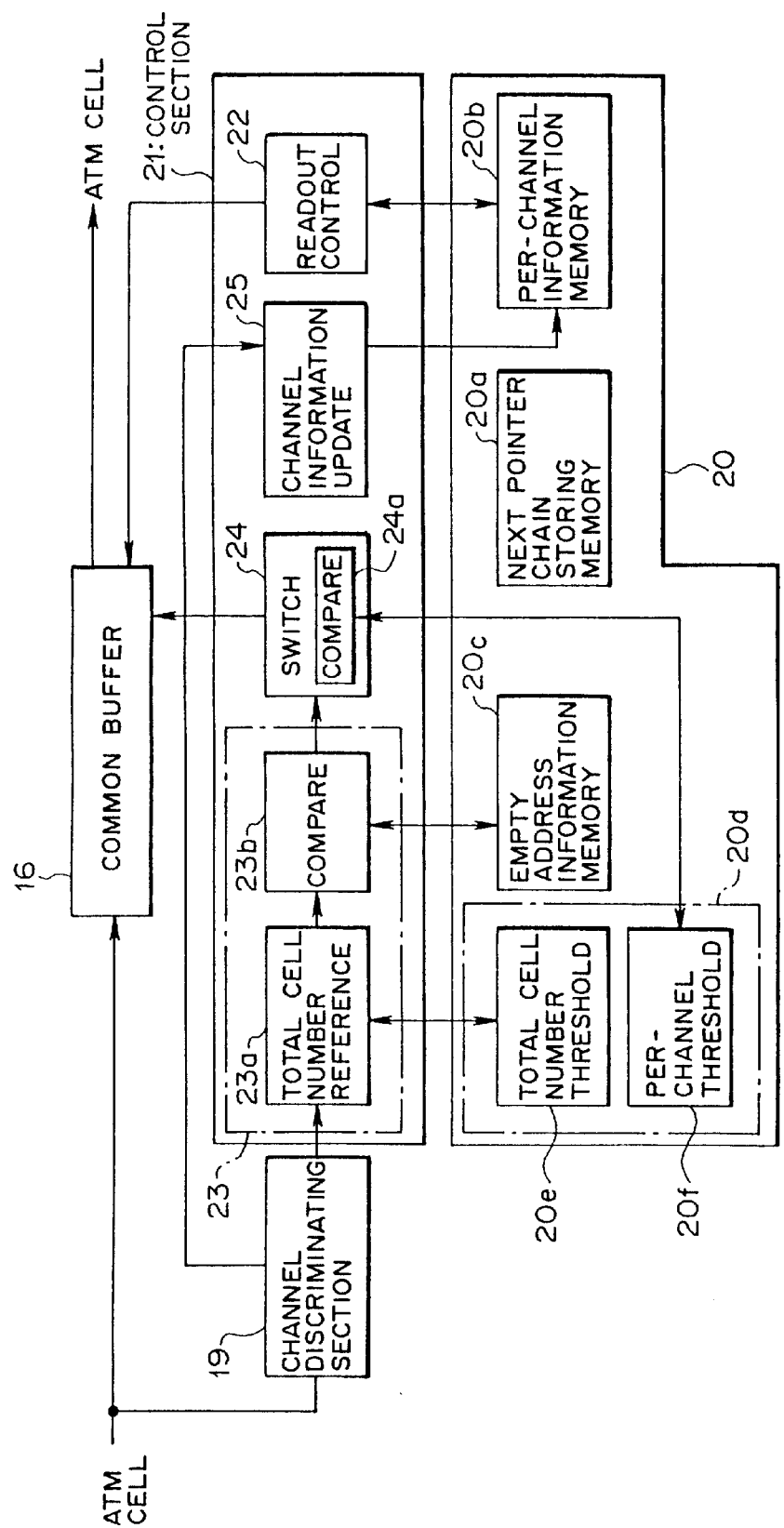
FIG. 5 is a block diagram showing a configuration of a control section in the buffer control apparatus in the above-mentioned embodiment.

For this purpose, as shown in FIG. 5, the control section 21 comprises not only the readout control section 22, but also a congested state detecting section 23, a common/discrete mode switching controller 24, and a channel information updating section 25; whereas the storage section 20 comprises a threshold memory 20d in addition to the next pointer chain storing memory 20a, per-channel information memory 20b, and empty address information memory 20c.

Figure 7:
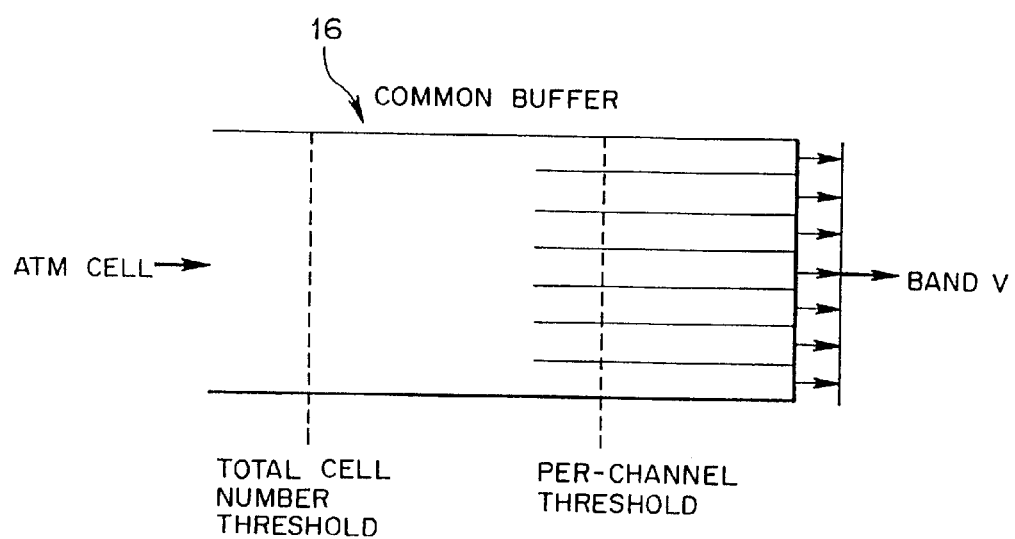
FIG. 7 is a schematic view for explaining a total cell number threshold value and per-channel threshold values in the buffer control apparatus in the above-mentioned embodiment.

The threshold memory (threshold storage section) 20d of the storage section 20 stores a threshold value concerning the congested state of the common buffer 16. Provided in this embodiment, as shown in FIG. 5, are a total cell number threshold memory (total data amount threshold storage section) 20e for storing a total cell number threshold value (see FIG. 7) concerning the total cell number (total data amount) within the common buffer 16, and a per-channel threshold memory (minimally guaranteed threshold storing section) 20f for storing a per-channel threshold value (minimally guaranteed threshold value; see FIG. 7) for the cell number to be minimally secured for each channel within the common buffer 16.

The congested state detecting section 23 detects a congested state of the common buffer 16 according to the threshold value of the threshold memory 20d. In this case, it detects the above-mentioned congested state when the total cell number within the common buffer 16 exceeds the total cell number threshold value of the total cell number threshold memory 20e so that the capacity remaining in the common buffer 16 becomes a predetermined value or lower.

For this purpose, the congested state detecting section 23 comprises, as shown in FIG. 5, a total cell number threshold referring section 23a and a comparing section 23b.

The total cell number threshold referring section 23a reads out a total cell number threshold value from the total cell number threshold memory 20d. The comparing section (total data amount evaluating section) 23b compares the total cell number threshold value read out by the total cell number threshold referring section 23a with the total cell number within the common buffer 16 obtained from the empty address number of the empty address information memory 20c, thereby judging whether the total cell number within the common buffer 16 exceeds the total data amount threshold value or not. Here, when the total cell number exceeds the total data amount threshold value, the common buffer 16 is judged to be in a congested state, whereby a trigger signal is supplied to a common/discrete mode switching controller 24.

Figure 6:
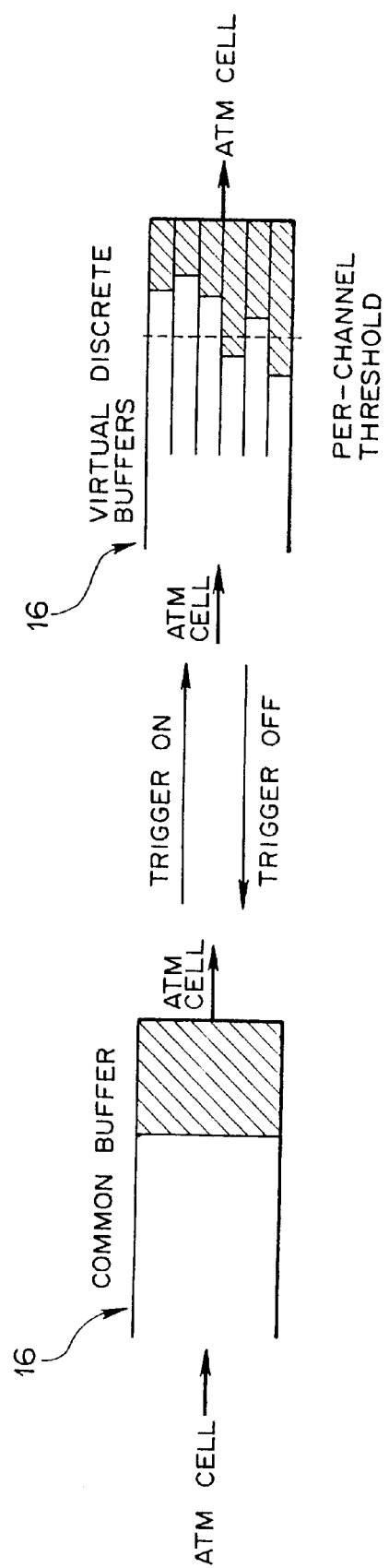
FIG. 6 is a schematic view for explaining an operation for switching between a common buffer and virtual discrete buffers in the buffer control apparatus in the above-mentioned embodiment.

The common/discrete mode switching controller 24 controls whether the common buffer 16 is virtually used as discrete buffers or as the common buffer 16 according to whether information from the individual memories 20a to 20c in the storage section 20 is recognized or not. In this embodiment, when the above-mentioned trigger signal is supplied from the congested state detecting section 23, the information from the individual memories 20a to 20c is recognized, whereby, as schematically shown in FIG. 6, the common buffer 16 is virtually switched over to discrete buffers, whereas it is switched over to the original common buffer 16 when the trigger signal is canceled.

As shown in FIG. 5, the common/discrete mode switching controller 24 comprises a comparing section (per-route data amount evaluating section) 24a for comparing, when the trigger signal is supplied, the per-channel threshold value of the per-channel threshold memory 20f with the cell number per channel within the common buffer 16 and thereby judging whether or not there is a channel (congested channel) in which the cell number per channel exceeds the per-channel threshold value. When the comparing section 24a judges that there is such a congested channel, buffering (storing processing) for new cells is restricted (the buffering priority is lowered) for this channel.

Namely, the common/discrete mode switching controller 24 functions as a storage processing restricting section which can restrain received cells from being stored into the common buffer 16 per channel when the congested state detecting section 23 detects a congested state of the common buffer 16.

The channel information updating section 25 successively updates the stored information of the per-channel information memory 20b in response to the result of channel discrimination by the channel discriminating section 19.

Consequently, the buffer control apparatus 18 performs cell buffering with respect to the common buffer 16 regardless of the channels when no trigger signal is generated by the congested state detecting section 23; whereas, when the trigger signal is generated, the buffer control apparatus 18 lowers the buffering priority for the congested channel where cells are accumulated in excess of the per-channel threshold value. As a result, when the common buffer 16 is congested, cells with a high rate are preferentially discarded, so that constant buffering and minimum band are secured for all the channels.

Thus, according to the buffer control apparatus 18 (buffer control method) in this embodiment, cells from a plurality of channels can be virtually stored in the common buffer 16 channel by channel, whereby the common buffer 16 can virtually be used as discrete buffers respectively provided for the respective channels. Accordingly, constant buffering can easily be attained for all the channels, whereby a band minimally required for each channel can firmly be secured for each channel without increasing the capacity of the buffer 16.

Also, in the buffer control apparatus 18, when the total cell number within the common buffer 16 exceeds a predetermined number, new cells are restrained from being stored into the common buffer 16 for the channel in which the number of cells exceeds the number to be minimally guaranteed within the common buffer 16. Thus can more securely be prevented from occurring is a phenomenon in which the cells received from a certain channel are stored within the common buffer 16 by a large amount while the bands of the other channels are not secured. Consequently, the minimum band can be secured for all the channels.

Though the congested state detecting section 23 in the control section 21 generates a trigger signal when the total cell number within the common buffer 16 exceeds the total cell number threshold value, it may generate the trigger signal when, for example, the number of active channels from which cells arrive exceeds a certain threshold value.

Figure 8:
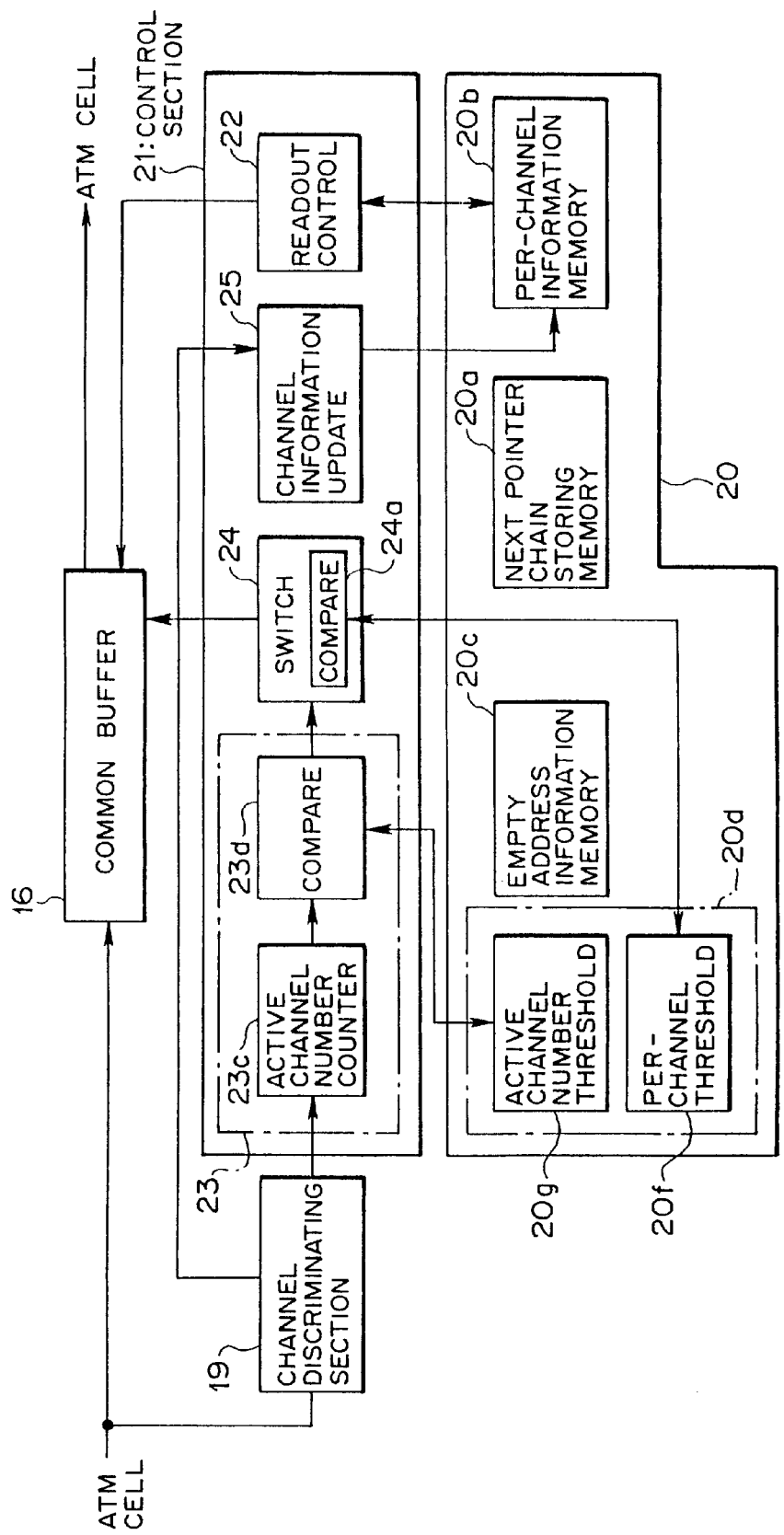
FIG. 8 is a block diagram showing another configuration of a control section in the buffer control apparatus in the above-mentioned embodiment.

In this case, as shown in FIG. 8, the congested state detecting section 23 comprises an active channel number counter 23c and a comparing section 23d; the threshold memory 20d comprises an active channel number threshold memory 20g; and the common/discrete mode switching controller 24 comprises a comparing section 24b. In FIG. 8, parts referred to with letters or numerals identical to those in FIG. 5 are similar thereto.

The active channel number threshold memory (active route number threshold storing section) 20g stores a threshold value (active route number threshold value) for the number of active channels from which cells arrive (which are receiving data). The active channel number counter 23c counts the number of active channels according to the result of channel identification in the channel discriminating section 19.

The comparing section (active route number evaluating section) 23d of the congested state detecting section 23 compares the active channel number obtained by the active channel number counter 23c with the threshold value of the active channel number threshold memory 20g, thereby judging whether or not the number of channels in an active state exceeds the active channel number threshold value. It outputs a trigger signal to the switching controller 24 when the number of channels in the active state exceeds the active channel number threshold value.

When the trigger signal is supplied from the comparing section 23d, the comparing section 24b of the common/discrete mode switching controller 24 compares the per-channel threshold value of the per-channel threshold memory 20f with the cell number per channel within the common buffer 16, thereby judging whether or not there is a channel (congested channel) in which the cell number per channel exceeds the per-channel threshold value. When the comparing section 24b judges that such a congested channel exists, the buffering priority for new cells with respect to this channel is lowered in this case as well.

Consequently, also in this case, buffering with respect to the common buffer 16 is performed regardless of the channels when no trigger signal is generated by the congested state detecting section 23; whereas, when the trigger signal is generated, the common buffer 16 is virtually switched over to discrete buffers, thus lowering the buffering priority for the congested channel where cells are accumulated in excess of the per-channel threshold value, whereby constant buffering and a minimum band are secured for all the channels.

When the active channel number is lower than the active channel number threshold value, the trigger signal is canceled, whereby the common/discrete mode switching controller 24 switches the virtual discrete buffers to the common buffer 16.

Figure 9:
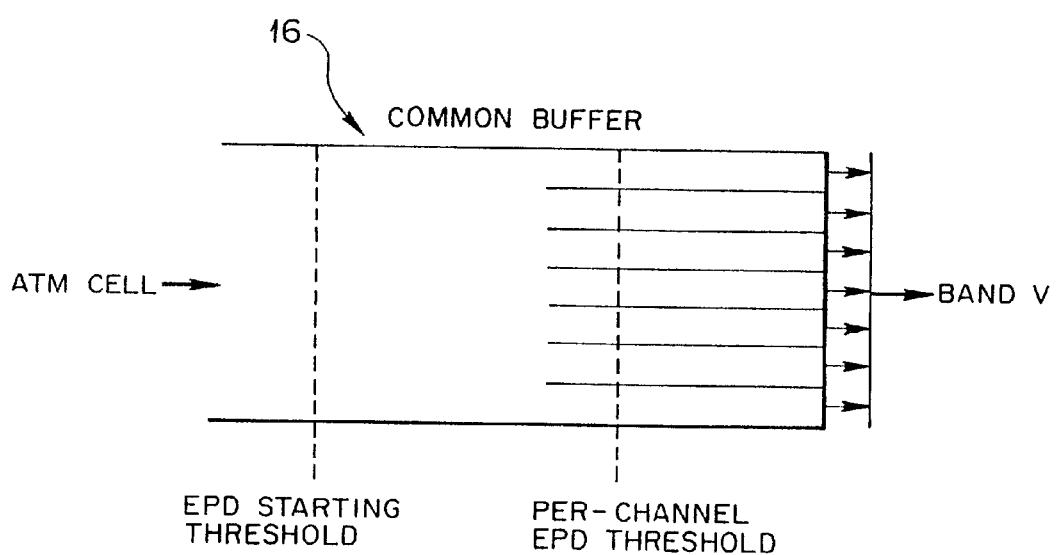
FIG. 9 is a schematic view for explaining an EPD-actuating threshold value and per-channel EPD threshold values in the buffer control apparatus in the above-mentioned embodiment.

The total cell number threshold value set in the total cell number threshold memory 20e or the active channel number threshold value set in the active channel number threshold memory 20g may be set as an EPD (Early Packet Discard)-starting threshold value (see FIG. 9), while the per-channel threshold value set in the per-channel threshold memory 20d may be set as a per-channel EPD threshold value (see FIG. 9).

The above-mentioned EPD refers to a control operation in which, in a state where the total cell number within the common buffer 16 exceeds a certain threshold value, all the ATM cells belonging to a newly arriving packet are discarded. As a result, when the total cell number (or active channel number) in the common buffer 16 is not greater than the EPD-starting value, all the arriving cells. are written into the common buffer 16 regardless of their connections; whereas, when the total cell number (or active channel number) exceeds the EPD-starting threshold value, the EPD is started with respect to the channel exceeding the per-channel EPD threshold value, and the switching controller 24 would not receive the cells belonging to a new packet arriving through this channel, thereby discarding the cells.

Nevertheless, even in the case where the total cell number exceeds the EPD-starting value (where the congested state of the common buffer 16 is detected by the congested state detecting section 23, whereby new received data are restrained from being stored into the common buffer 16 for a certain channel), cells which form the same packet together with the cells of this channel that have already been stored in the common buffer 16 are allowed to be stored into the common buffer 16.

Consequently, a part of the cells within a packet to be treated as a single data can be prevented from dropping off, whereby the configuration mentioned above can greatly contribute to improving the reliability of buffering.

In the following, details of the readout control section 22 will be explained.

Figure 10:
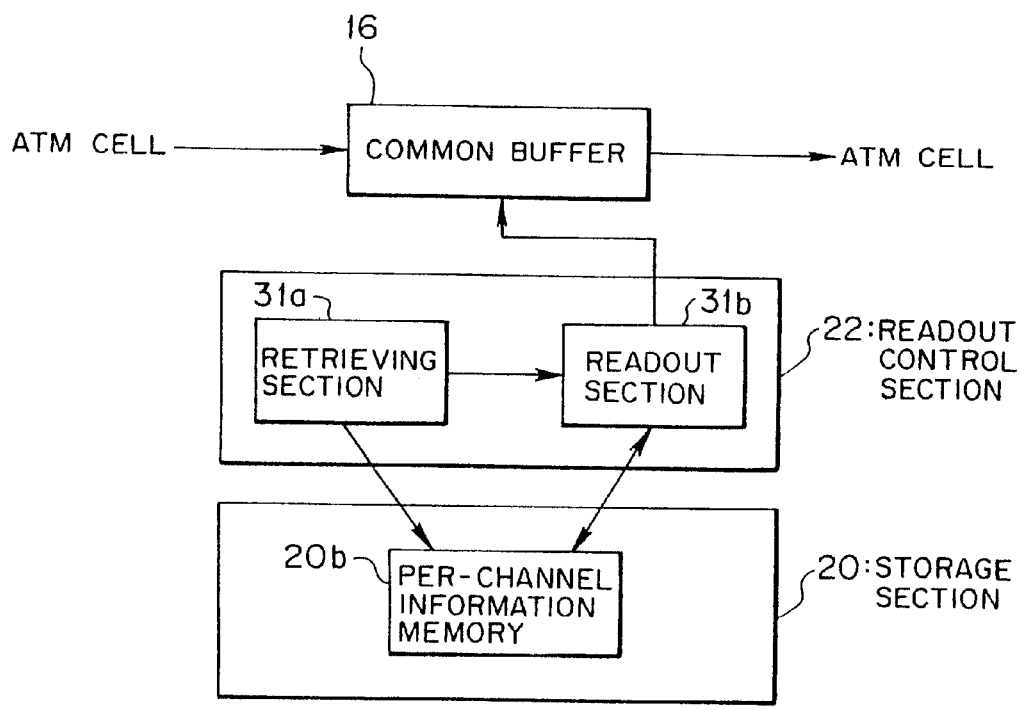
FIG. 10 is a block diagram showing a configuration of a readout control section in the buffer control apparatus in the above-mentioned embodiment.

As shown in FIG. 10, the readout control section 22 of this embodiment comprises a retrieving section 31a and a readout section 31b. Here, the retrieving section 31a retrieves a channel of a cell to be read out from the common buffer 16. In this embodiment, with reference to the stored information [per-channel cell number (cell number counter value); see FIG. 4] of the per-channel information memory 20b in the storage section 20, it retrieves the channel in which the cell number counter value is a value other than "0" so as to retrieve the channel (channel number) of the cell to be read out. Here, retrieval is skipped for the channel in which the cell number counter value in the per-channel information memory 20b is "0" (channel having no cells to be read out from the common buffer 16).

According to the channel number obtained by the retrieving section 31a, the readout section 31b refers to the per-channel information of the per-channel information memory 20b, acquires the storing position (address) of the cell to be initially read out within the common buffer 16 in this channel number, extracts the cell stored at this address from the common buffer 16, and sends out thus extracted cell.

As a result, in the readout control section 22, the retrieving section 31a retrieves a channel having a cell to be read out in which the cell number counter value of the per-channel information memory 20b is a value other than "0"; whereas the readout section 31b acquires the address (leading address; see FIG. 4) of the cell to be initially read out in this channel from the per-channel information memory 20b. Then, the readout section 31b extracts one cell from the address of the common buffer 16 indicated by the leading address, and outputs thus extracted cell.

Subsequently, in a similar manner, channels having the cells to be read out are retrieved, and the cells virtually stored within the common buffer 16 for the respective channels are read out one by one for each channel, whereby the cells are read out from the common buffer 16 at a predetermined period. Here, the retrieval is skipped for the channel in which the cell number counter value of the per-channel information memory 20b is "0" (channel having no cells to be read out from the common buffer 16), whereby the readout processing is skipped (no unnecessary data such as idle cells are outputted).

Figure 11:
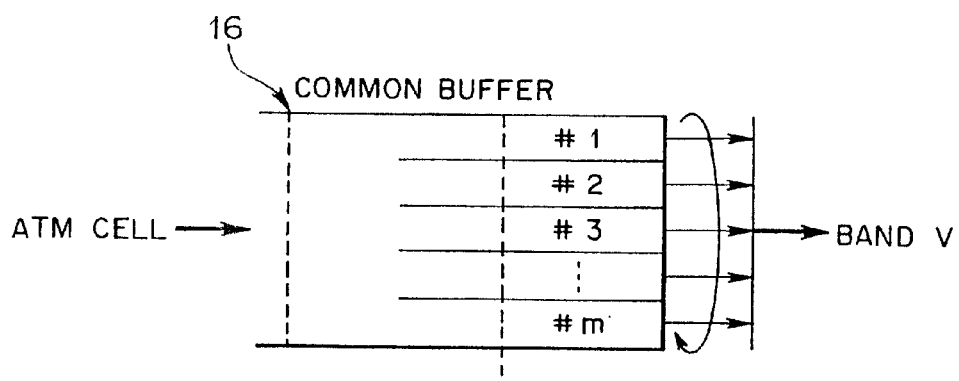
FIG. 11 is a schematic view for explaining an operation of the readout control section in the buffer control apparatus in the above-mentioned embodiment.

As a result, for example, as shown in FIG. 11, assuming that the total number of channels is m, and the output line band is V, since the cells of the individual channels are basically read out in sequence, a band of at least V/m (when a cell to be read out exists in each channel) is secured for each of all the channels m; whereas, when there exist n channels (n being a natural number lower than m) having no cell to be read out, a band of V/(m−n) is secured for each of all the channels m.

Thus, as the retrieving section 31a skips retrieving the channels where no cells to be read out exist, the readout control section 22 does not read out unnecessary data such as idle cells for the channels having no cells to be read out, thereby making the output band V variable depending on whether or not the cells to be read out exist in each channel. Accordingly, a wider band can be secured for each channel.

In the following, details of the retrieving section 31a will be explained.

Figure 12:
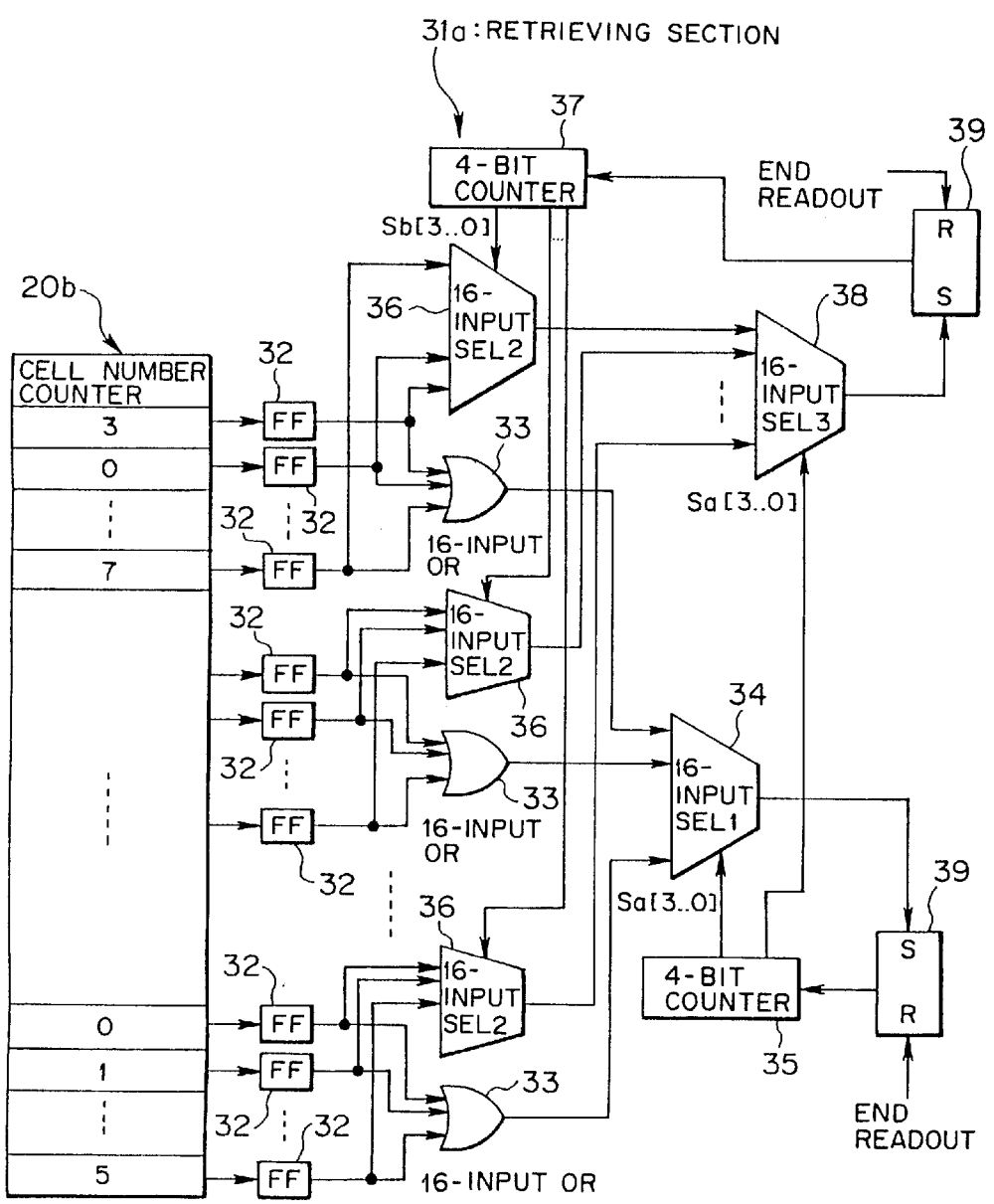
FIG. 12 is a block diagram showing a detailed configuration of a retrieving section in the readout control section in the above-mentioned embodiment.

FIG. 12 is a block diagram showing a detailed configuration of the retrieving section 31a. As shown in this drawing, the retrieving section 31a comprises flip-flop (FF) circuits 32 whose number corresponds to the input channel number m (wherein m=256 here); 16 pieces of 16-input OR circuits 33; 16-input selectors 34, 36, and 38 (SEL 1 to 3); 4-bit counters 35 and 37; and set-reset flip-flop (SRFF) circuits 39.

Here, each FF circuit 32 outputs an "H" level pulse (turns ON) when the cell number counter value of the per-channel information memory 20b is a value other than "0"; whereas each 16-input OR circuit 33 concentrates therein 16 output lines of the respective FF circuits 32' (i.e., the FF circuits 32 are divided into 16 groups each composed of 16 pieces of FF circuits 32), and is turned ON when any or all of these 16 inputs are turned ON.

The 16-input selector 34 (SEL 1) retrieves (selects), of the outputs of the respective OR circuits 33, those in the ON state. In this embodiment, from the output (counter value Sa [3 . . . 0]) of the 4-bit counter 35, 16 pieces of inputs are sequentially searched from "0000"; and, when an ON-state input is detected during searching, its output is turned ON, whereby the SRFF circuit 39 is turned ON, and the operation of the 4-bit counter 33 is stopped (so as to hold its counter value Sa [3 . . . 0] at that time).

Each 16-input selector 36 (SEL2) retrieves (selects), of the outputs of its concentrating 16 pieces of FF circuits 32, those in the ON state. As with the selector 34, from the output (counter value Sb [3 . . . 0] of the 4-bit counter 37, 16 pieces of inputs are sequentially searched from "0000"; and, when an ON-state input is detected during searching, its output is turned ON.

The 16-input selector 38 (SEL 3) retrieves (selects), of the outputs of each of the above-mentioned selectors (SEL 2) 36, those in the ON state. Here, its output is turned ON when the ON-state input coincides with the counter value Sa [3 . . . 0] of the 4-bit counter 35, whereby the output of the SRFF circuit 39 is turned ON, and the operation of the 4-bit counter 37 is stopped (so as to hold its counter value Sb [3 . . . 0] at that time).

In thus configured retrieving section 31a, when at least one FF circuit 32 is turned ON within the above-mentioned 16 groups, the output of the OR circuit 33 concentrating this FF circuit 32 is turned ON, whereby an ON signal is inputted to the selector 34. According to the 4-bit counter 35, the selector 34 sequentially searches 16 pieces of inputs from "0000" and, when an ON-state input is detected during searching, outputs an ON signal so as to set the SRFF circuit 39. Consequently, the counting operation of the 4-bit counter 35 is stopped, and the counter value Sa [3 . . . 0] is held.

Subsequently, when the counting operation of the 4-bit counter 35 is stopped as mentioned above, the selector 36 within each group similarly searches 16 pieces of inputs sequentially from "0000" according to the 4-bit counter 37 and, when an ON-state input is detected, the counting operation of the counter 37 is stopped, thus making the corresponding selector 36 to output an ON signal.

When the selector 36 outputs an ON signal, it is fed into the selector 38. Here, when the ON-state input in the selector 38 coincides with the output of the 4-bit counter 35 (counter value Sa [3 . . . 0]), the selector 38 outputs an ON signal, whereby the output of the SRFF circuit 39 is turned ON. The value of 8 bits in total made of the 4bbit counter value Sa [3 . . . 0] of the counter 35 and the 4-bit counter value Sb [3 . . . 0] of the counter 37 indicates the channel number in which a cell to be read out exists.

In the readout control section 22, according to the channel number thus obtained by the retrieving section 31a, the readout section 31b refers to the per-channel information memory 20b so as to acquire the leading address of the cell to be read out, reads out a cell from the address within the common buffer 16 indicated by the leading address, and outputs a readout terminating signal to the retrieving section 31a after the readout operation is completed.

In the retrieving section 31a, on the other hand, as the readout terminating signal is fed into each SRFF circuit 39, the latter is reset, whereby the counting operation in each of the counters 35 and 37 is resumed from the stopped point, thus retrieving a channel in which a cell to be subsequently read out exists.

Namely, the retrieving section 31a of this embodiment divides 256 channels into 16 groups, retrieves a group in which a cell to be read out from the common buffer 16 exists, and retrieves, within thus retrieved group, a channel in which the cell to be read out from the common buffer 16 exists.

Accordingly, it can hierarchically retrieve a channel in which a cell to be read out exists, whereby the number of clocks (number of processing operations) required for retrieving the channel in which the cell to be read out exists can be greatly reduced, thus extremely contributing to speeding up the readout control and cutting down the power consumption.

Here, the selector 34 and 4-bit counter 35 function as a group retrieving section for retrieving the above-mentioned group, whereas the selectors 36 and 4-bit counter 37 function as a channel retrieving section for retrieving the channel within the retrieved group.

(1) Explanation of First Modified Example of Readout Control Section 22

Figure 13:
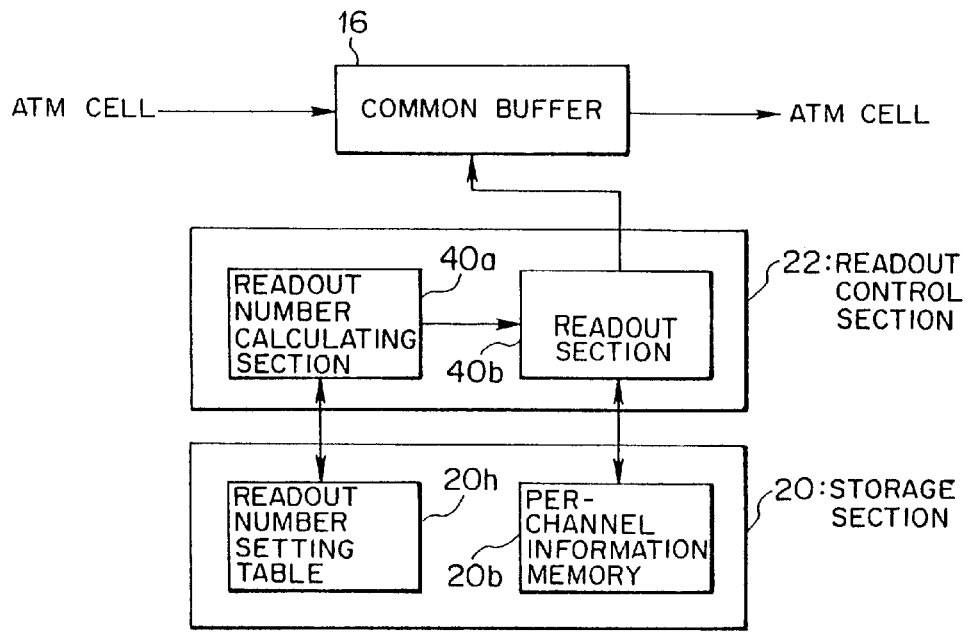
FIG. 13 is a block diagram showing a first modified example of the readout control section in the above-mentioned embodiment.

FIG. 13 is a block diagram showing a first modified example of the readout control section 22. As shown in this drawing, the readout control section 22 in this first modified example comprises a readout number calculating section 40a and a readout section 40b. Here, the storage section 20 comprises not only the above-mentioned per-channel information memory 20b but also a readout number setting table 20h. The next pointer chain storing memory 20a and the empty address information memory 20c are not depicted here.

Figure 14:
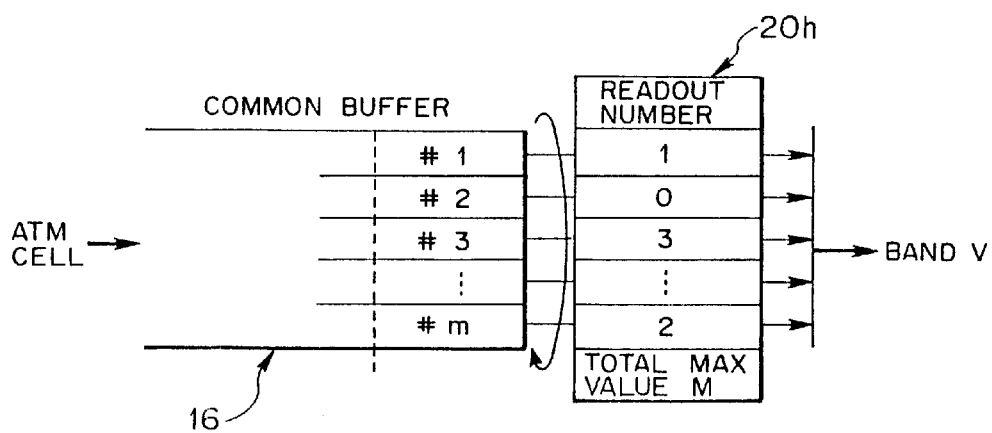
FIG. 14 is a schematic view for explaining an operation of the readout control section in the first modified example.

For example, as shown in FIG. 14, the readout number setting table (first readout data amount setting section) 20h of the storage section 20 sets a total maximum value of the number of cells read out from the common buffer 16 by a single access thereto (readout number: first readout data amount) and the number of readout operations for all the channels.

In the readout control section 22, on the other hand, the readout number calculating section 40a calculates the readout control number per channel according to each set value of the table 20h, whereas the readout section 40b performs readout control with respect to the common buffer 16 by the readout control number obtained by the readout number calculating section 40a with reference to the per-channel information in the per-channel information memory 20b.

Consequently, the readout control section 22 performs the cell readout control by the number set in the readout number setting table 20h. Namely, when "1" is set at a certain channel in the table 20h, one cell is read out for this channel by a single access to the common buffer 16; whereas, when "3" is set at a certain channel in the table 20h, three cells are read out for this channel by a single access to the common buffer 16.

Accordingly, for example, as shown in FIG. 14, assuming that the output band is V, and the total maximum value of the readout number is M, a band of (n/M)×V is minimally secured for a channel whose readout number is n. Namely, a minimally allocated band obtained when the output band V is divided by the total maximum value M is employed as a unit, and the minimum band can be changed by integral multiples of this unit.

As in the case of cyclic readout explained with reference to FIGS. 10 and 11, the readout operation is skipped for the channel having no cells to be read out (channel for which "0" is set in the table 20h), whereby a band obtained when V is divided in proportion to the readout number is allocated to the channel in which a cell to be read out exists.

Thus, the readout control section 22 in the first modified example reads out a predetermined number of cells per channel from the common buffer 16 according to the readout number that is set in the table 20h. Accordingly, as the setting of the table 20h is changed according to a user's need, the minimally guaranteed band allocated to each channel can be made variable per channel, whereby the minimum band can be secured more flexibly.

For setting the above-mentioned table 20h, the easiest and realistic is a method in which a maintainer sets a necessary band (readout number) with respect to a fixedly set path such as PVC (Permanent Virtual Channel) when making a contract with a user. Nevertheless, even in a path such as SVC (Switched Virtual Channel) in which call setting and disconnection are frequently effected, the above-mentioned table can be set by use of an unused portion of a signaling cell.

Figure 15:
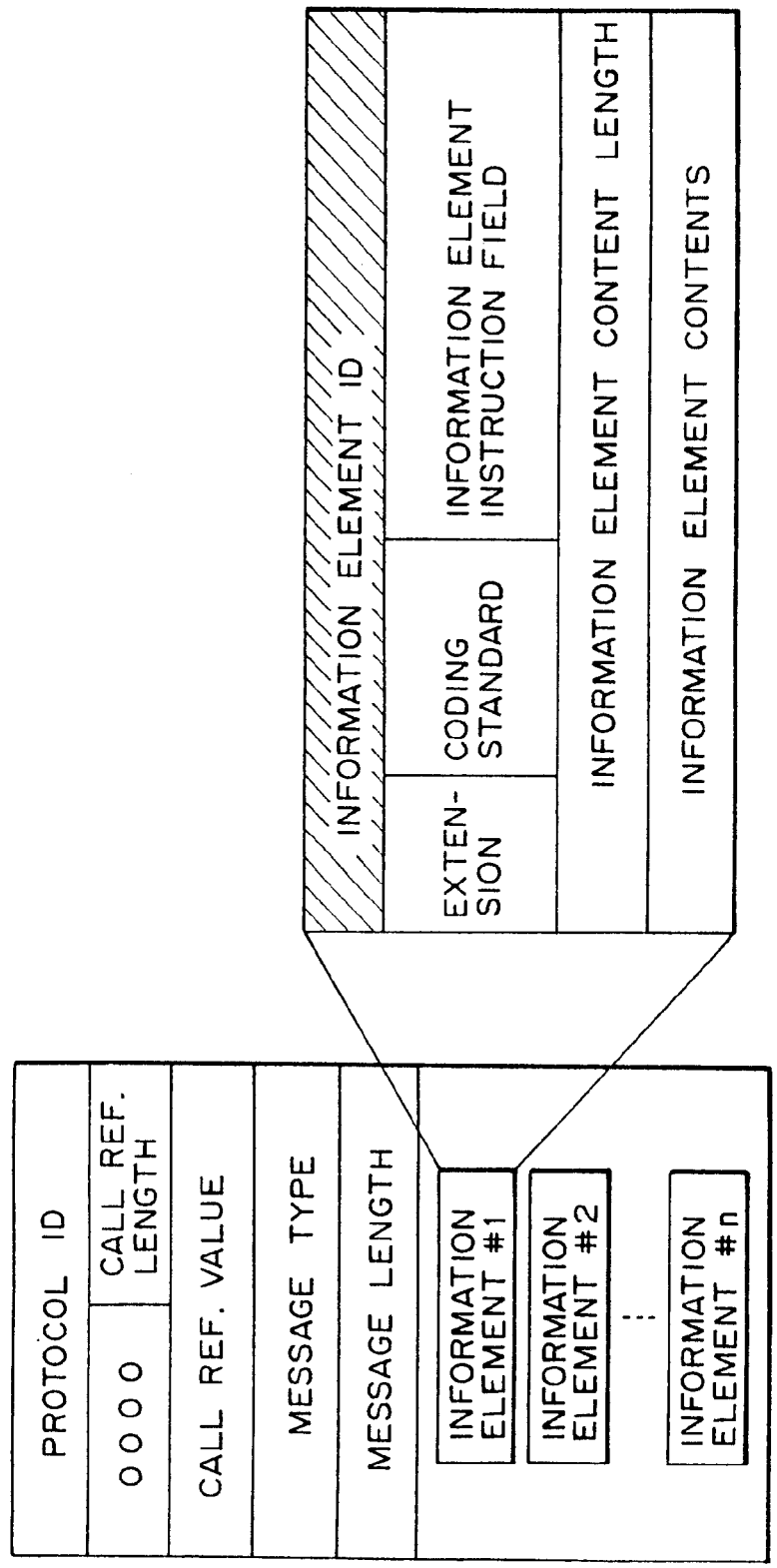
FIG. 15 is a view showing an example of format of a signaling cell.

FIG. 15 is a view schematically showing an example of format of a signaling cell. As shown in this drawing, in general, a signaling cell comprises a protocol identifier, a call reference length, a call reference value, a message type, a message length, a plurality of information elements, and the like. In this modified example, for example, the above-mentioned "message type" indicates that the own cell is used for signaling. The "information element" is used for transferring the address or ATM connection attribute value necessary for setting a call, and its contents are identified by the information element identifier (hatched portion in FIG. 15).

Here, an unusable portion of the information element identifier is newly defined for setting a minimally guaranteed band, and the minimally guaranteed bandwidth is stored within the information element, whereby the minimum band can also be secured for SVC by signaling.

Figure 16:
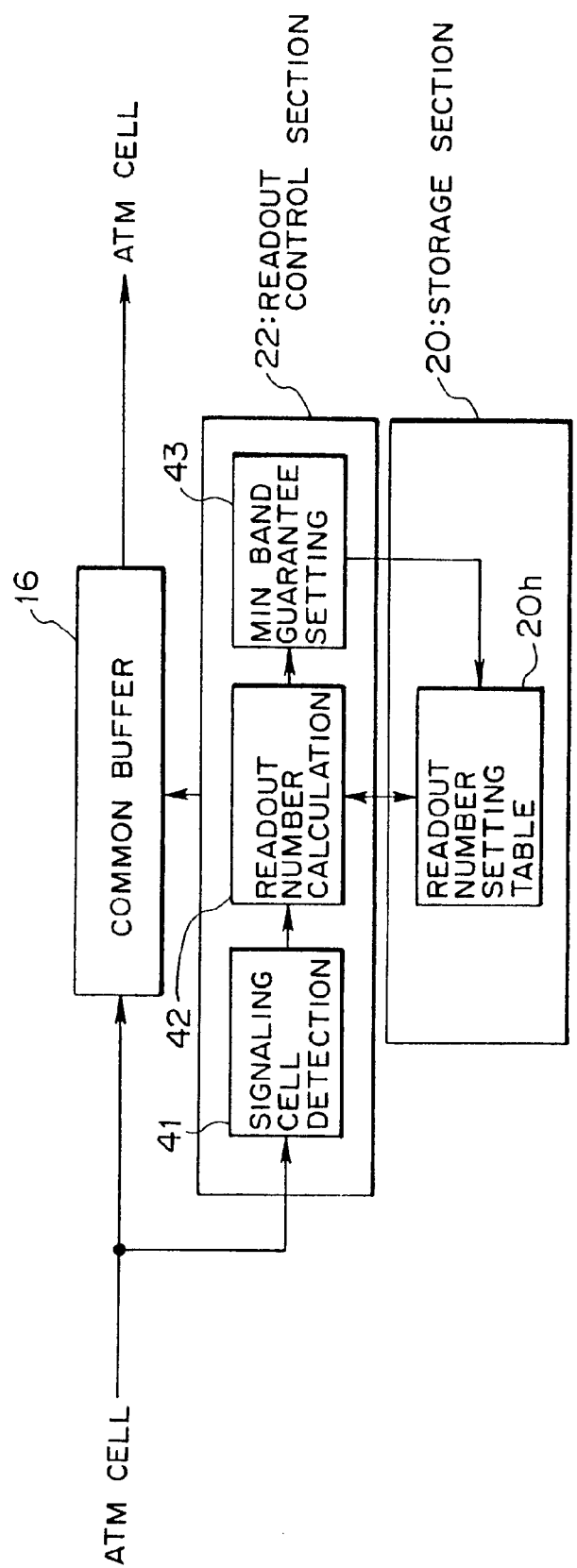
FIG. 16 is a block diagram showing another configuration of the readout control section in the first modified example.

In this case, as shown in FIG. 16, the readout control section 22 comprises a signaling cell detecting section 41, a readout number evaluating section 42, and a minimum band guarantee setting section 43.

The signaling cell detecting section 41 detects the signaling cell explained above with reference to FIG. 15, by referring to the "message type" within its format, for example. When the detecting section 41 detects a signaling cell, the readout number evaluating section 42 refers to the bandwidth (readout number) set in the unused portion in the "information element identifier" within this cell, and refers to the table 20h of the storage section 20, thereby judging whether or not the readout number set within the signaling cell can be set in the table 20h without exceeding the above-mentioned total maximum value.

When the readout number evaluating section 42 judges that the readout number set in the signaling cell can be set in the table 20h, the minimum band guarantee setting section 43 sets the readout number set within the signaling cell into the corresponding channel in the table 20h.

Consequently, in the readout control section 22, the cell readout number in the table 20h (first readout data amount) can be set from an external device such as subscriber's terminal 11. Accordingly, the number of cells to be read out at once from the common buffer can be changed per channel so as to alter the band to be allocated to each channel, whereby the minimum band can be secured for each channel more flexibly.

(2) Explanation of Second Modified Example of Readout Control Section 22

Figure 17:
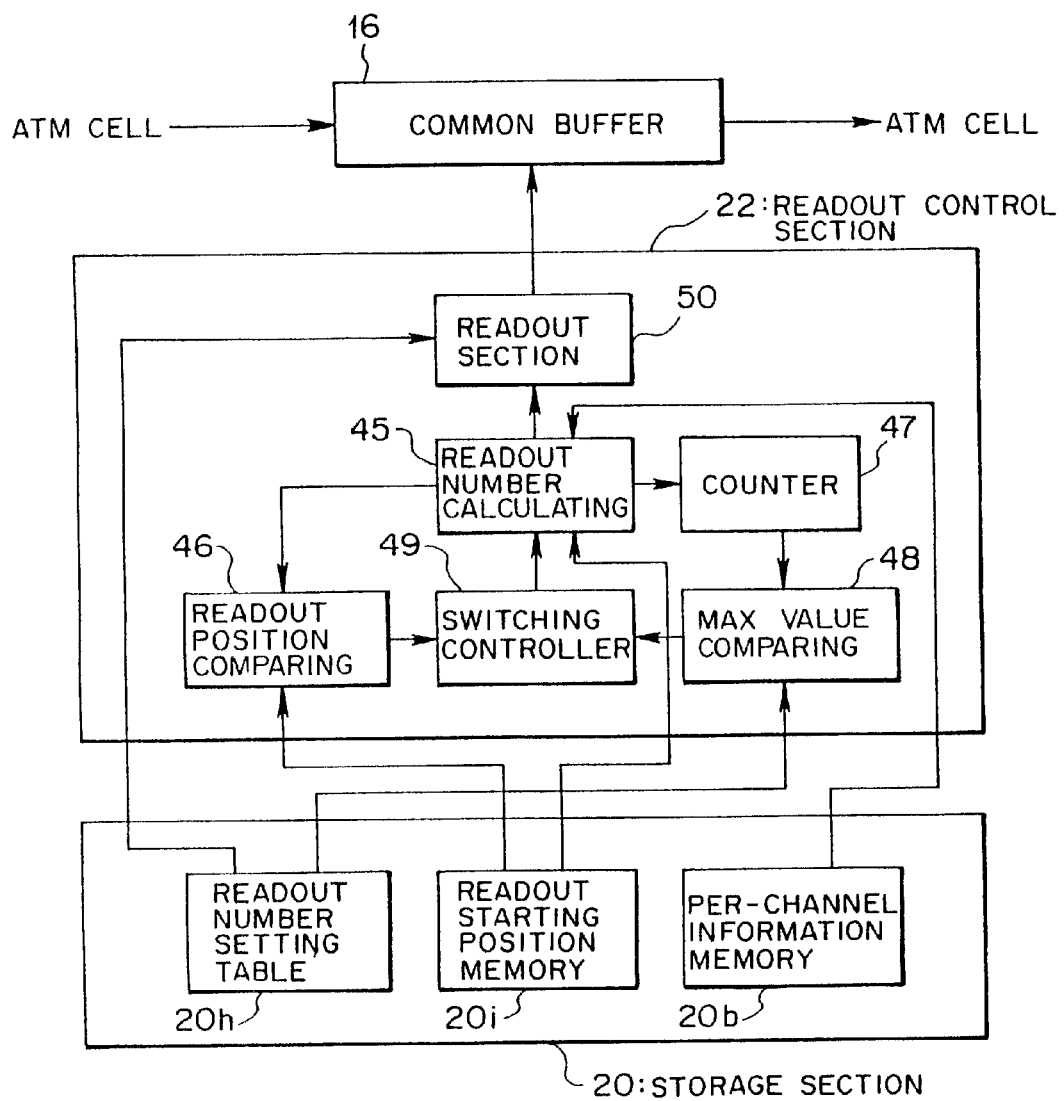
FIG. 17 is a block diagram showing a second modified example of the readout control section in the above mentioned embodiment.

FIG. 17 is a block diagram showing a second modified example of the readout control section 22. As shown in this drawing, the readout control section 22 of the second modified example comprises a readout number calculating section 45, a readout position comparing section 46, a counter 47, a maximum value comparing section 48, a switching controller 49, and a readout section 50. Here, the storage section 20 comprises not only the per-channel information memory 20b, but also a readout number setting table 20h and a readout starting position memory 20i.

In the storage section 20, the readout starting position memory 20i stores a readout starting channel number as positional information for starting readout control with respect to the common buffer 16.

On the other hand, the readout number calculating section 45 in the readout control section 22 calculates the number of readout control operations (number of readout cells) for each channel with respect to the common buffer 16. In this modified example, whether to perform calculation according to each set value (see FIG. 18) of the readout number setting table 20h or to output the readout number "1" is changed over in response to a switching signal (trigger signal) from the switching controller 49.

With reference to the per-channel information of the per-channel information memory 20b, the readout section 50 performs cell readout operations with respect the common buffer 16 by the number corresponding to the result of calculation performed by the readout number calculating section 45. In this modified example, the channel number initially subjected to the readout control is stored in the readout starting position memory 20i.

The readout position comparing section 46 compares the channel number stored in the readout starting position memory 20i with the channel number currently being subjected to the readout control by the readout number calculating section 45. When these numbers coincide with each other, it outputs a trigger signal to the switching controller 49 while assuming that one round of readout control has finished for all the channels.

The counter 47 counts up its count value every time the readout number calculating section 45 performs a readout control operation, thereby counting the total readout control number with respect to the common buffer 16 regardless of channels. The maximum value comparing section 48 compares thus counted value with the total maximum value M (see FIG. 18) set in the table 20h. When the count value and the maximum value M coincide with each other, it outputs a trigger signal to the switching controller 49.

In response to a trigger signal received from one of the comparing sections 46 and 47, by controlling the calculation process in the readout number calculating section 45, the switching controller 49 switches between a readout control operation based on each set value of the table 20h (minimum band guarantee control) and a cyclic readout control operation in which cells in each channel is cyclically read out one by one. As a result of this switching action, a constant band can be allocated to each channel after the minimum band guarantee control.

Namely, after performing the readout control for all the channels according to each set value of the table 20h in the storage section 20, the readout control section 22 in this modified example cyclically reads out a constant data amount (by one cell in this case) from the common buffer 16 for each channel.

Figure 18:
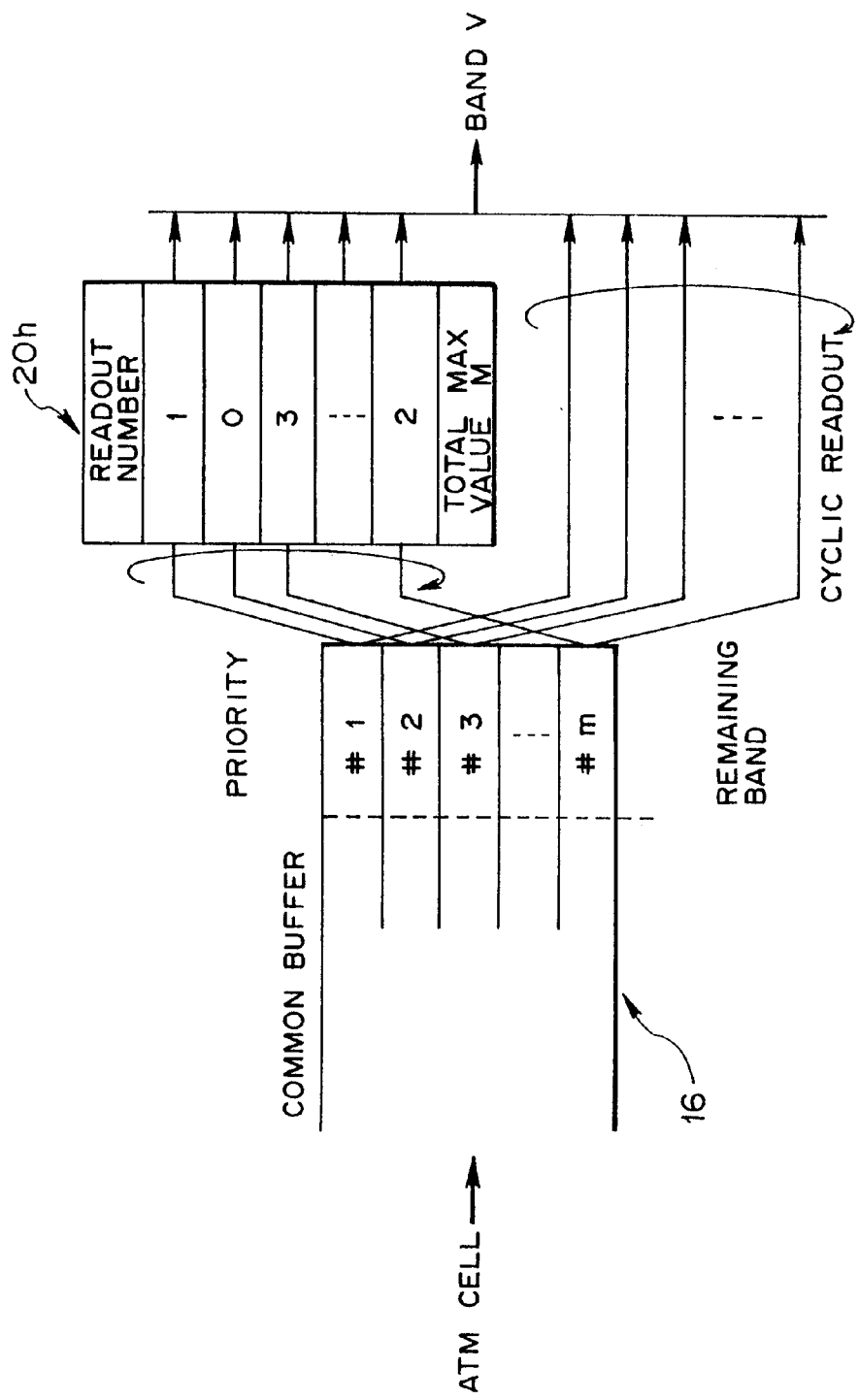
FIG. 18 is a schematic view for explaining an operation of the readout control section in the second modified example.

Due to such a configuration, in the readout control section 22, as shown in FIG. 18, at first, the readout number calculating section 45 preferentially reads out, in sequence and by a number corresponding to each set value, cells from a channel in which the cells exist (performs minimum band guarantee control) according to each set value of the table 20h and the per-channel information of the per-channel information memory 20b; whereas the channel number started with the readout control is stored in the readout starting position memory 20i.

The readout position comparing section 46 sequentially compares the channel number being subjected to the readout control by the readout number calculating section 45 with the channel number stored in the readout starting position memory 20i; and, when these channel numbers coincide with each other, outputs a trigger signal to the switching controller 49 while assuming that one round of readout control has finished. When receiving this trigger signal, the switching controller 49 notifies the readout number calculating section 45 of switching the readout control with respect to the common buffer 16 from the minimum band guarantee control to the cyclic readout control.

When receiving this notification, the readout number calculating section 45 outputs readout number "1" to the readout section 50 at a predetermined period. In response to this output, as schematically shown in FIG. 18, the readout section 50 reads out one cell each from all the channels whose cells are accumulated in the common buffer 16. Namely, when there is an excess in the band after one round of cell readout by the minimum band guarantee control has finished for all the channels, the readout control section 22 in this modified example allocates this excess band to each channel by reading out one cell each from all the channels whose cells are accumulated in the common buffer 16 (by round robin).

For example, assuming that the readout number is N (N being a natural number) after one round of the preferential readout by the minimum band guarantee control has finished, an excess band of (M−N)×V is formed, all of which is evenly allocated by round robin.

Here, the maximum value comparing section 48 compares the count value (total readout control number with respect to the common buffer 16) counted by the counter 47 and the maximum value M set in the table 20h; and, when the count value reaches the maximum value M, outputs a trigger signal to the switching controller 49. When receiving this trigger signal, the switching controller 49 switches the readout control for the common buffer 16 to the minimum band guarantee control once again.

(3) Explanation of Third Modified Example of Readout Control Section 22

Figure 19:
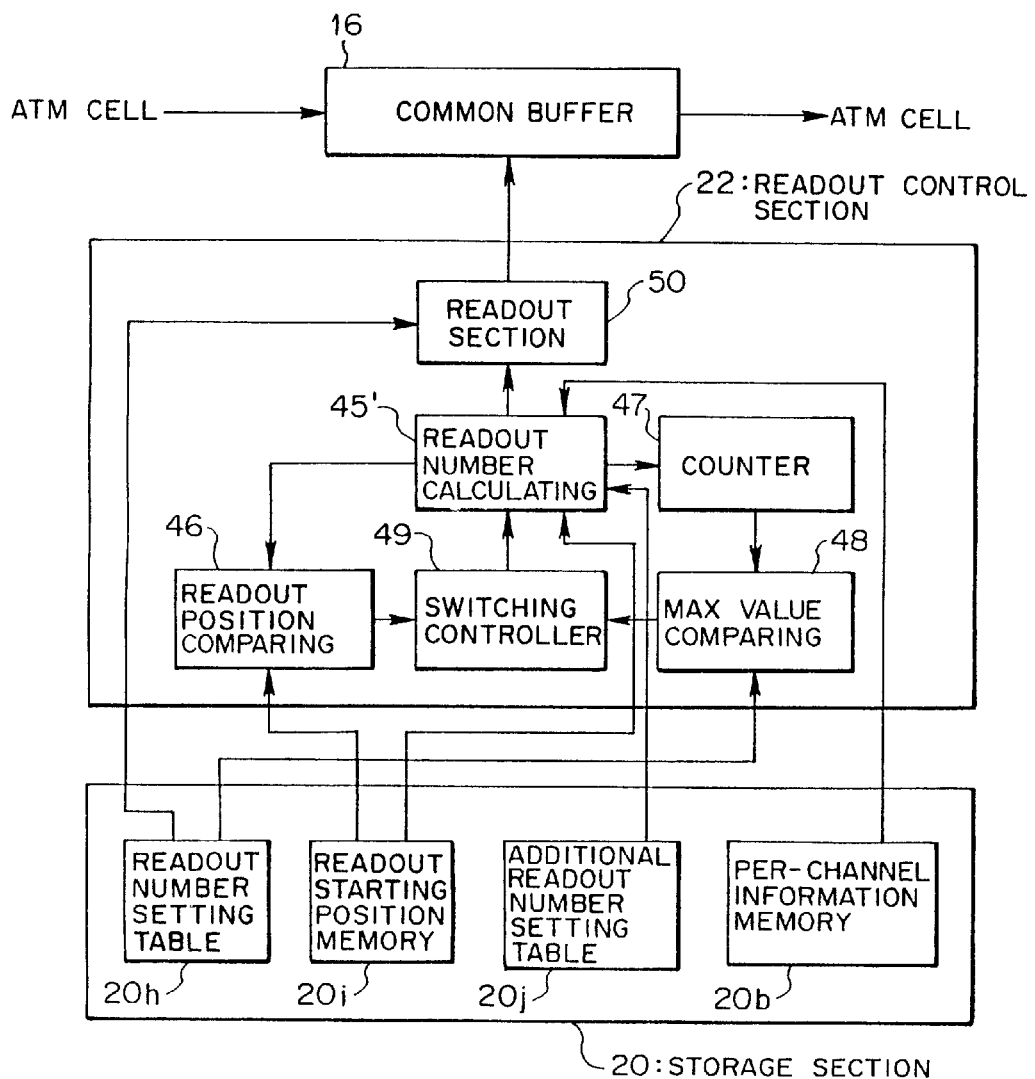
FIG. 19 is a block diagram showing a third modified example of the readout control section in the above-mentioned embodiment.

FIG. 19 is a block diagram showing a third modified example of the readout control section 22. As shown in this drawing, the readout control section 22 of the third modified example differs from that shown in FIG. 17 in that it comprises a readout number calculating section 45' in place of the readout number calculating section 45. Here, the storage section 20 is provided with an additional readout number setting table 20j.

The additional readout number setting table (second readout data amount setting section) 20j sets an additional readout number (second readout data amount) to be read out from the common buffer 16 for each channel so that the sum of this additional readout number and each readout number in the table 20h becomes the same throughout the channels. For example, in FIG. 20, the additional readout number of each channel is set such that the total readout number in each channel becomes "3".

Though the readout number calculating section 45' has substantially the same function as that of the readout number calculating section 45 explained with reference to FIG. 17, it switches the readout number calculation between that based on the table 20h and that based on the table 20j, in response to the switching signal from the switching controller 49. Namely, the readout control section 22 switches the readout control for the common buffer 16 between the minimum band guarantee control and the readout control (additional readout control) based on the table 20j.

Figure 20:
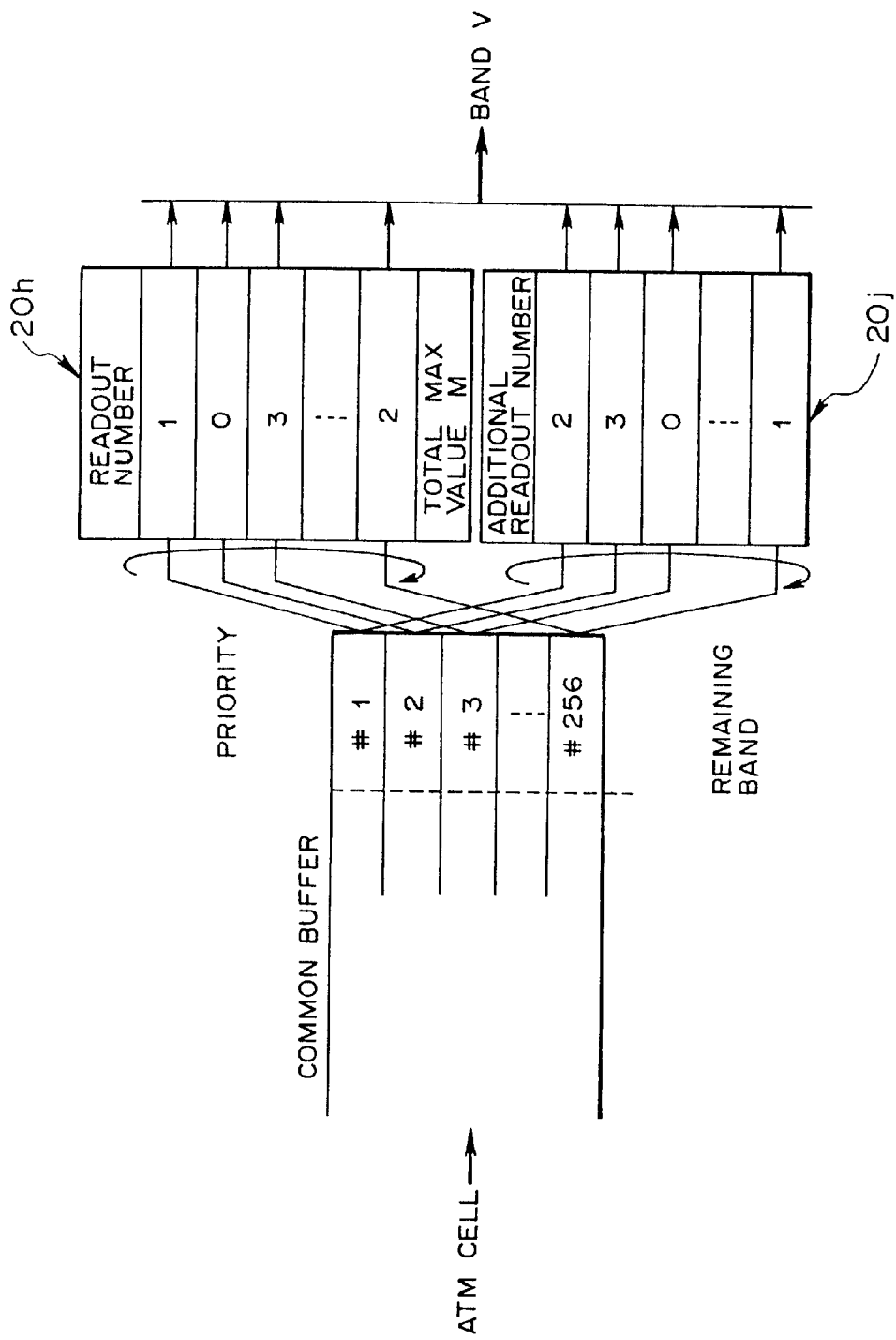
FIG. 20 is a schematic view for explaining an operation of the readout control section in the third modified example.

In the readout control section 22, according to such a configuration, first, as shown in FIG. 20, the readout number calculating section 45' preferentially reads out, in sequence and by a number corresponding to each set value, cells from a channel in which the cells exist (performs minimum band guarantee control) according to each set value of the table 20h and the per-channel information of the per-channel information memory 20b; whereas the channel number started with the readout control is stored in the readout starting position memory 20i.

The readout position comparing section 46 sequentially compares the channel number being subjected to the readout control by the readout number calculating section 45' with the channel number stored in the readout starting position memory 20i; and, when these channel numbers coincide with each other, outputs a trigger signal to the switching controller 49 while assuming that one round of readout control has finished. When receiving this trigger signal, the switching controller 49 notifies the readout number calculating section 45' of switching the readout control with respect to the common buffer 16 from the minimum band guarantee control to the additional readout control.

When receiving this notification, the readout number calculating section 45' calculates a readout number according to each set value of the table 20j as shown in FIG. 20, and the readout section 50 reads out cells from the common buffer 16 by the number corresponding to the result of this calculation. For example, in this case, assuming that the maximum value of each set value per channel in the table 20h is "3" as schematically shown in FIG. 20, the additional readout number for each channel is obtained when the readout number for the minimum band guarantee is subtracted from "3". Accordingly, each readout number becomes "3" throughout the channels.

Subsequently, the readout control section 22 alternately performs the minimum band guarantee control and the additional readout control until the count value of the counter 47 reaches the maximum value M.

Namely, after performing the readout control of cells from the common buffer 16 for all the channels according to each set value of the table 20h, the readout control section 22 reads out cells from the common buffer 16 for each channel according to each set value of the table 20j in which the additional readout number is set for each channel such that the readout number becomes the same throughout the channels. Accordingly, the whole output band V of the common buffer 16 can be evenly allocated to all the channels.

(4) Explanation of Fourth Modified Example of Readout Control Section 22

Figure 21:
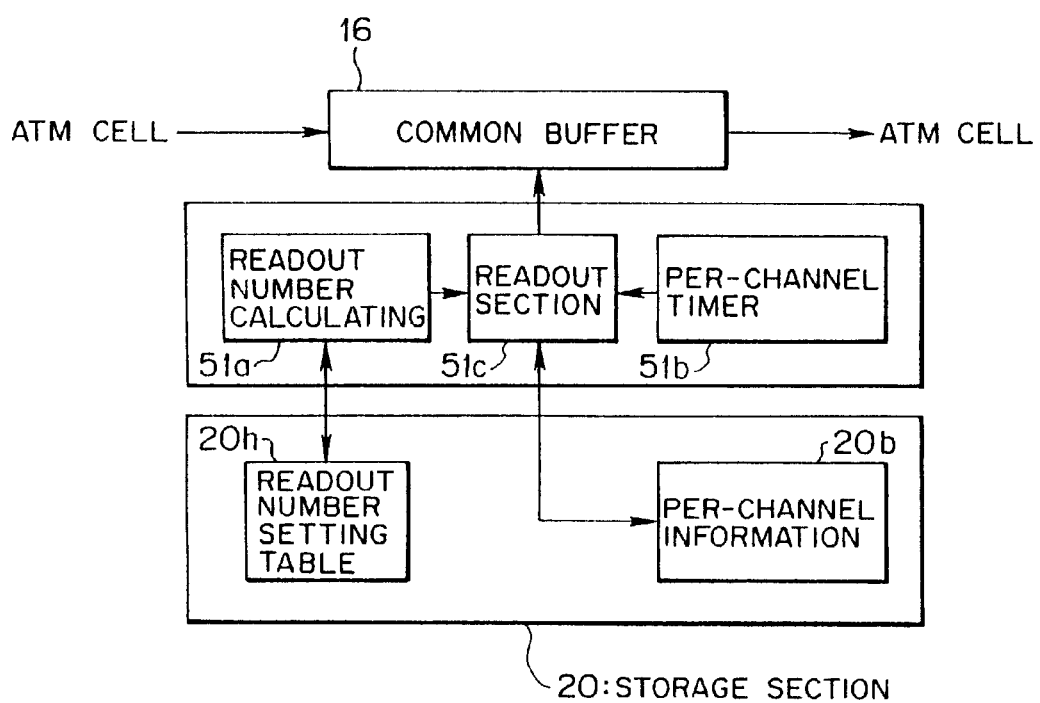
FIG. 21 is a block diagram showing a fourth modified example of the readout control section in the above-mentioned embodiment.

FIG. 21 is a block diagram showing a fourth modified example of the readout control section 22. As shown in this drawing, the readout control section 22 of the fourth modified example comprises a readout number calculating section 51a, a per-channel timer 51b, and a readout section 51c. In FIG. 21, constituents referred to with numerals or letters identical to those shown in FIG. 13 are similar to those explained with reference to FIG. 13.

As with the readout number calculating section 40a explained with reference to FIG. 13, the readout number calculating section 51a calculates the readout control number per channel according to each set value of the table 20h (see FIG. 18). The readout section 51c performs the readout operations with respect to the common buffer 16 for each channel by the number corresponding to the result of calculation by the readout number calculating section 51a with reference to the per-channel information of the per-channel information memory 20b. In this modified example, it reads out one cell of the corresponding channel every time when the per-channel timer 51b times out.

Figure 22:
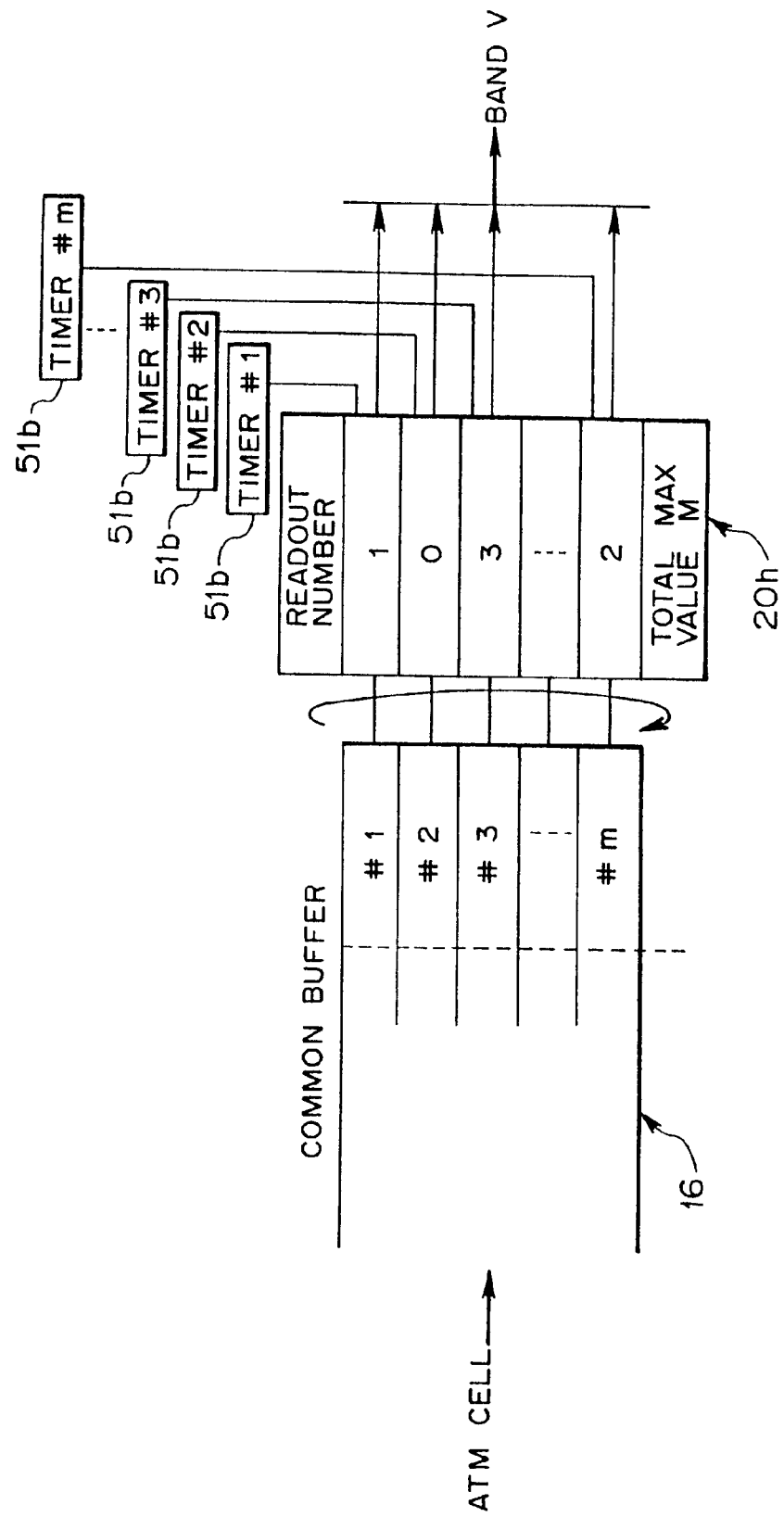
FIG. 22 is a schematic view for explaining an operation of the readout control section in the fourth modified example.

For example, as schematically shown in FIG. 22, the per-channel timer 51b is provided for each channel and outputs a cell readout timing at a predetermined interval per each set value of the table 20h. Here, the timeout time is set at an inverse time of the maximum allocation band for each channel, whereby the readout timing is outputted at an interval corresponding to the inverse time of the maximum allocation band for each channel.

Here, in a channel with the output band of V, total readout maximum value of M, and readout number n, the maximum allocation band is assumed to be a band which satisfies the range not greater than V but at least (n/M)×V.

As a result of this configuration, in the readout control section 22 of the fourth modified example, the readout number calculating section 51a calculates the readout number according to the table 20h; and, when reading out cells from the common buffer 16, the readout section 51c reads out the cells one by one in response to the timeout of the per-channel timer 51b. Accordingly, even when a plurality of cells are read out at once, each cell can be read out at a constant time interval (inverse time of the maximum allocation band).

Consequently, it is possible to alleviate a burst characteristic per channel which may occur when a plurality of cells are read out from the common buffer 16 upon a single access thereto.

This cell readout interval control effected by the per-channel timer 51b is also applicable to the readout control section 22 in the second modified example (see FIGS. 17 and 18) or that in the third modified example (see FIGS. 19 and 20).

(5) Explanation of Fifth Modified Example of Readout Control Section 22

Figure 23:
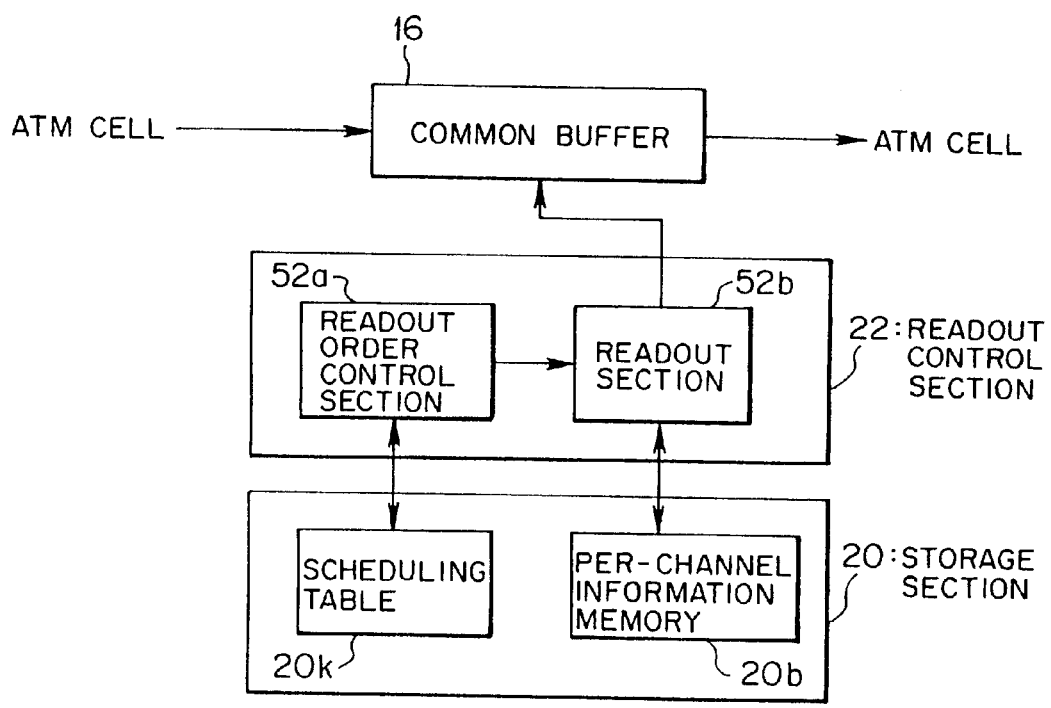
FIG. 23 is a block diagram showing a fifth modified example of the readout control section in the above-mentioned embodiment.

FIG. 23 is a block diagram showing a fifth modified example of the readout control section 22. As shown in this drawing, the readout control section 22 of the fifth modified example comprises a readout order control section 52a and a readout section 52b. Here, the storage section 20 is provided with a scheduling table 20k.

Figure 24:
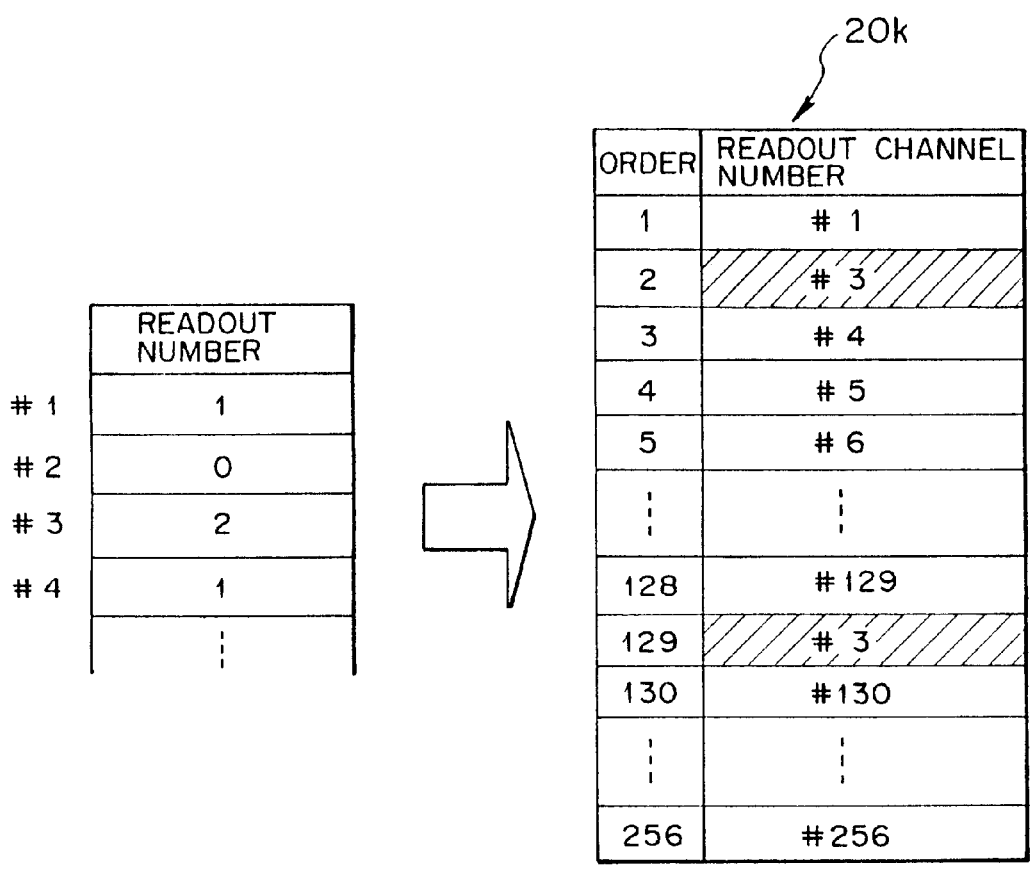
FIG. 24 is a view showing an example of scheduling table used in the readout control section in the fifth modified example.

The scheduling table 20k is used for defining a data readout interval for each set value of the table 20h. In this modified example, assuming that the channel number m=256, and the total readout maximum value M=256, a cell-sending timing is described in a time table of 256 slots at the time of call setting. For example, as shown in FIG. 24, assuming that the total maximum value M=256, and the readout number for channel #3 is 2, scheduling is performed at separated readout positions such as the 2nd and 129th positions (see hatched portions in FIG. 24).

The readout order control section 52a sequentially reads out the number of channel of the cell to be read out with reference to the scheduling table 20k in order of the setting in the table 20k, and supplies this channel number to the readout section 52b. The readout section 52b refers to the per-channel information in the per-channel information memory 20b according to the channel number outputted from the readout order control section 52a, thereby acquiring an address of the cell to be read out within the common buffer 16. Then, it extracts a cell stored at this address and sends out thus extracted cell.

In the readout control section 22 in the fifth modified example, according to such a configuration, the readout order control section 52a sequentially reads out the channel numbers set in the scheduling table 20k; and, in the order of thus read-out channel numbers, the readout section 52b sequentially reads out cells from the common buffer 16. Accordingly, when the cell readout order is set so as to jump across positions separated from each other in the table 20k for a channel in which a plurality of cells are read out as mentioned above, a separated readout interval can be provided among the cells.

Accordingly, as with the above-mentioned fourth modified example, it is possible to alleviate the burst characteristic per channel that may occur when a plurality of cells are read out from the common buffer 16 upon a single access thereto.

This cell readout interval control effected by the scheduling table 20k is also applicable to the readout control section 22 in the second modified example (see FIGS. 17 and 18) or that in the third modified example (see FIGS. 19 and 20), as with the above-mentioned readout interval control effected by the per-channel timer 51.

(6) Explanation of Sixth Modified Example of Readout Control Section 22

Figure 25:
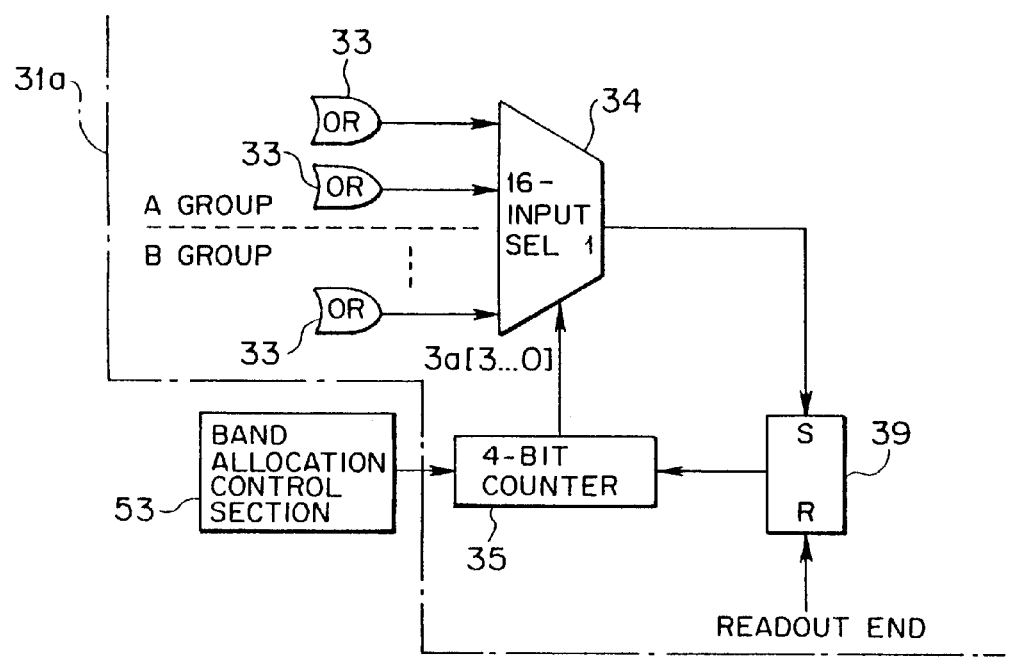
FIG. 25 is a block diagram showing a sixth modified example of the readout control section in the above-mentioned embodiment.

FIG. 25 is a block diagram showing a sixth modified example of the readout control section 22. As shown in this drawing, the readout control section 22 in this modified example comprises a band allocation control section 53 in addition to the retrieving section 31a explained with reference to FIGS. 10 and 12.

The band allocation control section 53 divides the channels into a plurality of groups, and performs the cell readout control with respect to the common buffer 16 for each group, thereby controlling a band to be allocated to each group. In this modified example, by controlling the output (count value Sa [3 . . . 0]) of the 4-bit counter 35 in the retrieving section 31a, it controls the number of accesses to each of the OR circuits 33 concentrated by the 16-input selector 34.

Consequently, in the readout control section 22, for example, in the case where the OR circuits 33 are divided into A and B groups as shown in FIG. 25, different bands can be respectively allocated to groups A and B when the band allocation control section 53 controls the counter value Sa [3

. . . 0] of the 4-bit counter 35 such that the groups A and B have numbers of accesses different from each other.

Namely, under the control of the band allocation control section 53, the readout control section 22 in this modified example can set, group by group, a band to be allocated to each channel.

Accordingly, for a plurality of channels sharing the same band, by controlling one selector 34 (upon a single setting operation), the same band can be allocated to each of the channels, whereby the burden of band allocation control on each channel can be reduced greatly.

(7) Explanation of Seventh Modified Example of Readout Control Section 22

Figure 26:
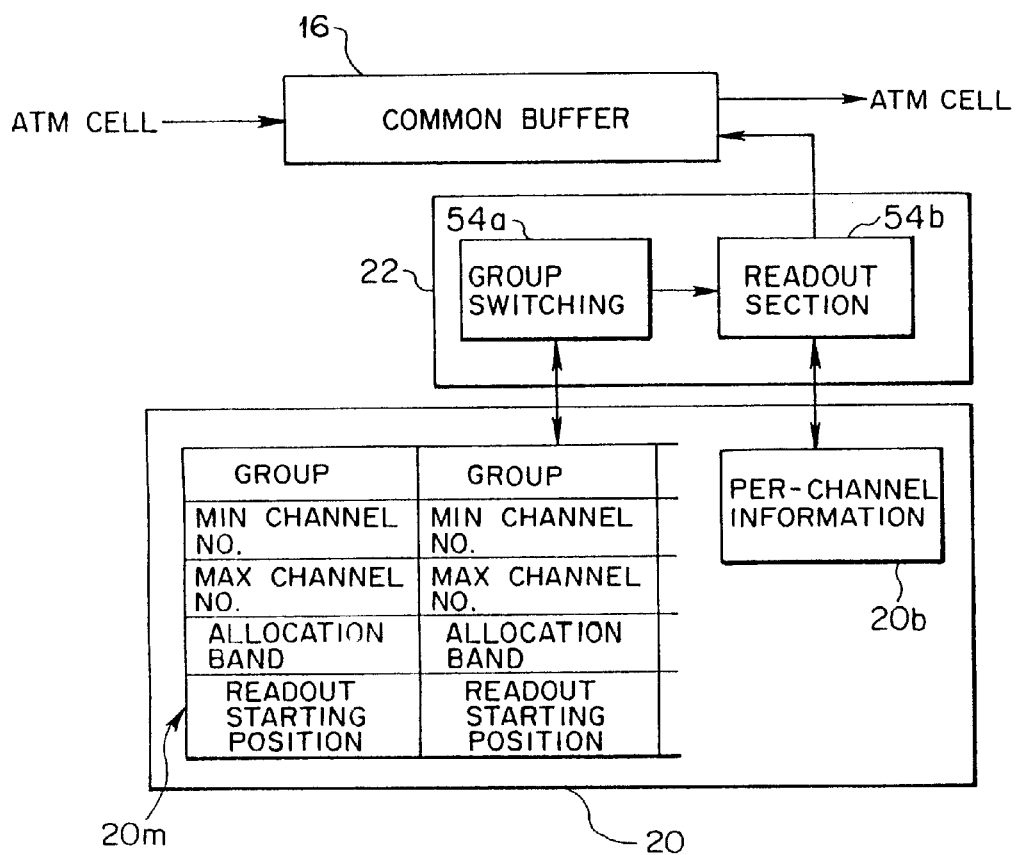
FIG. 26 is a block diagram showing a seventh modified example of the readout control section in the above-mentioned embodiment.

FIG. 26 is a block diagram showing a seventh modified example of the readout control section 22. As shown in this drawing, the readout control section 22 of the seventh modified example comprises a group switching controller 54a and a readout section 54b. Here, the storage section 20 comprises not only the above-mentioned per-channel information memory 20b but also a common group table 20m.

In the storage section 20, the common group table 20m sets channel dividing information for dividing the channels into a plurality of groups. In this modified example, as shown in FIG. 26, the minimum and maximum channel numbers constituting each group when the channels are divided into a plurality of groups, as well as the band to be allocated to this group, the position (channel number) for starting the readout control, and the like are set for each group.

In the readout control section 22, on the other hand, the group switching controller 54a switches, group by group, the setting information referred to within the common group table 20m. According to the reference setting information of the group switching controller 54a and the per-channel information of the per-channel information memory 20b, the readout section 54b reads out cells from the common buffer 16. In this modified example, after cells of the channels in a certain group from the minimum channel number to the maximum channel number are read out from the common buffer 16 by the amount corresponding to the allocated band, the group switching controller 54a switches the reference setting information group for the table 20m to the next group, for which cells are read out similarly.

In the readout control section 22 in this modified example, according to such a configuration, first, the group switching controller 54a refers to the setting information of a certain group within the common group table 20m, whereby the readout section 54b sequentially reads out cells from the common buffer 16 from the channel number set for the readout starting position in the table 20m. When the readout channel number reaches the maximum channel number set in the common group table 20m, the group switching controller 54a refers to the table 20m, sequentially reads out cells from the minimum channel number again, and outputs thus read-out channel number to the readout section 54b.

After the readout section 54b reads out cells from the common buffer 16 by the amount corresponding to the allocated band set in the common group table 20m, the group switching controller 54a writes into the readout starting position in the common group table 20m the next channel number to be read out, shifts the setting information to be referred to in the table 20m to the next group, and causes the readout section 54 to start reading out cells similarly.

Namely, according to the information in the common group table 20m, the readout control section 22 performs the cell readout control with respect to the common buffer 16 for each desired group. Accordingly, when each setting of the minimum and maximum channel numbers in the common group table 20m is appropriately changed, the channel configuration of a group can be flexibly modified so as to perform the cell readout control by this group, whereby a group sharing the same band can be formed quite flexibly.

(8) Explanation of Eighth Modified Example of Readout Control Section 22

Figure 27:
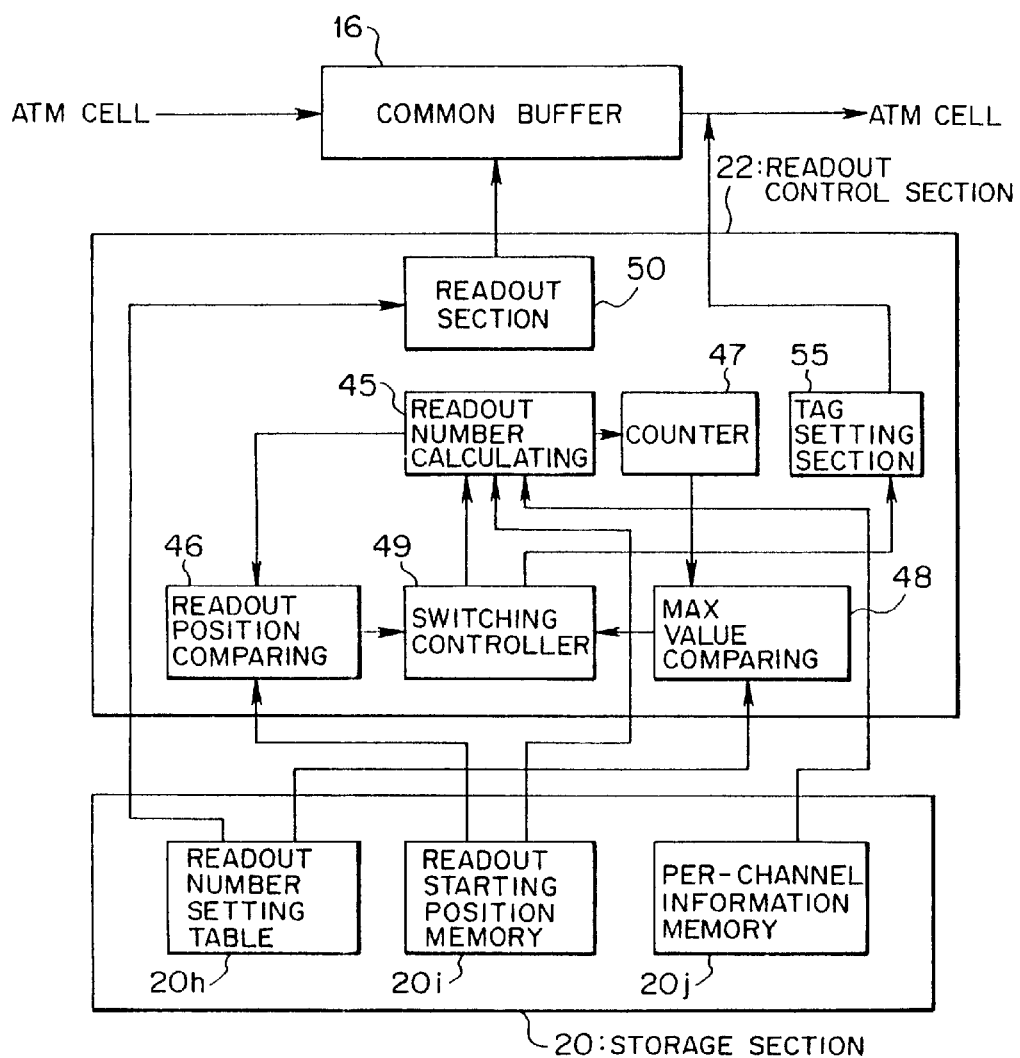
FIG. 27 is a block diagram showing an eighth modified example of the readout control section in the above-mentioned embodiment.

FIG. 27 is a block diagram showing an eighth modified example of the readout control section 22. As shown in this drawing, the readout control section 22 of the eighth modified example differs from that shown in FIG. 17 in that it has a tag setting section 55.

The tag setting section 55 sets no tag to each cell which is read out according to each set value of the table 20h when the readout control with respect to the common buffer 16 is switched to the minimum band guarantee control; whereas it sets a tag to each cell which is cyclically read out from the common buffer 16 when the readout control with respect to the common buffer 16 is switched to the cyclic readout control. Here, for example, as shown in FIGS. 29(a) and 29(b), cell loss priority (CLP) bit defined within a cell header 56 is set to "0" and "1" to respectively indicate the tag is off and on.

Figure 29A:
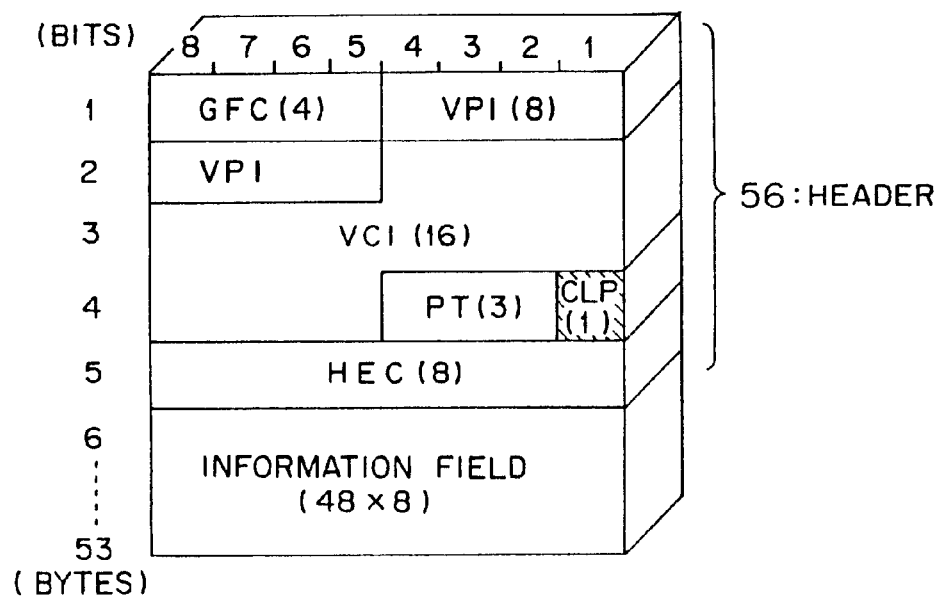
FIGS. 29($a$) and 29($b$) are views each showing a format of an ATM cell.
Figure 29B:
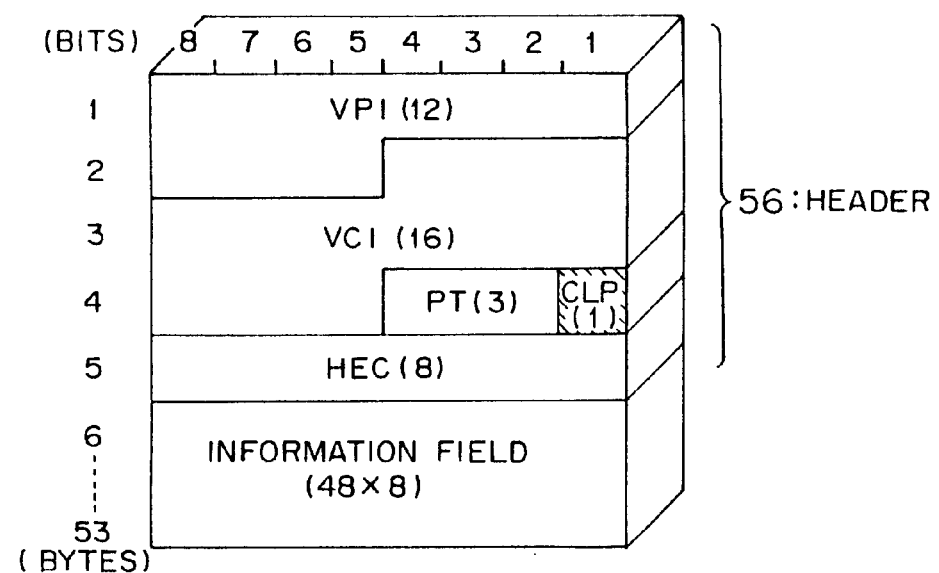

Here, FIG. 29(a) shows a cell format in a user-network interface (UNI), whereas FIG. 29(b) shows a cell format in a network-node interface (NNI). Since it is necessary for cells in the UNI to be controlled so as to prevent them from colliding with each other, a part (4 bits) of 12-bit VPI in the NNI cell are allocated to the UNI cell as general flow (GF) control bits.

Figure 28:
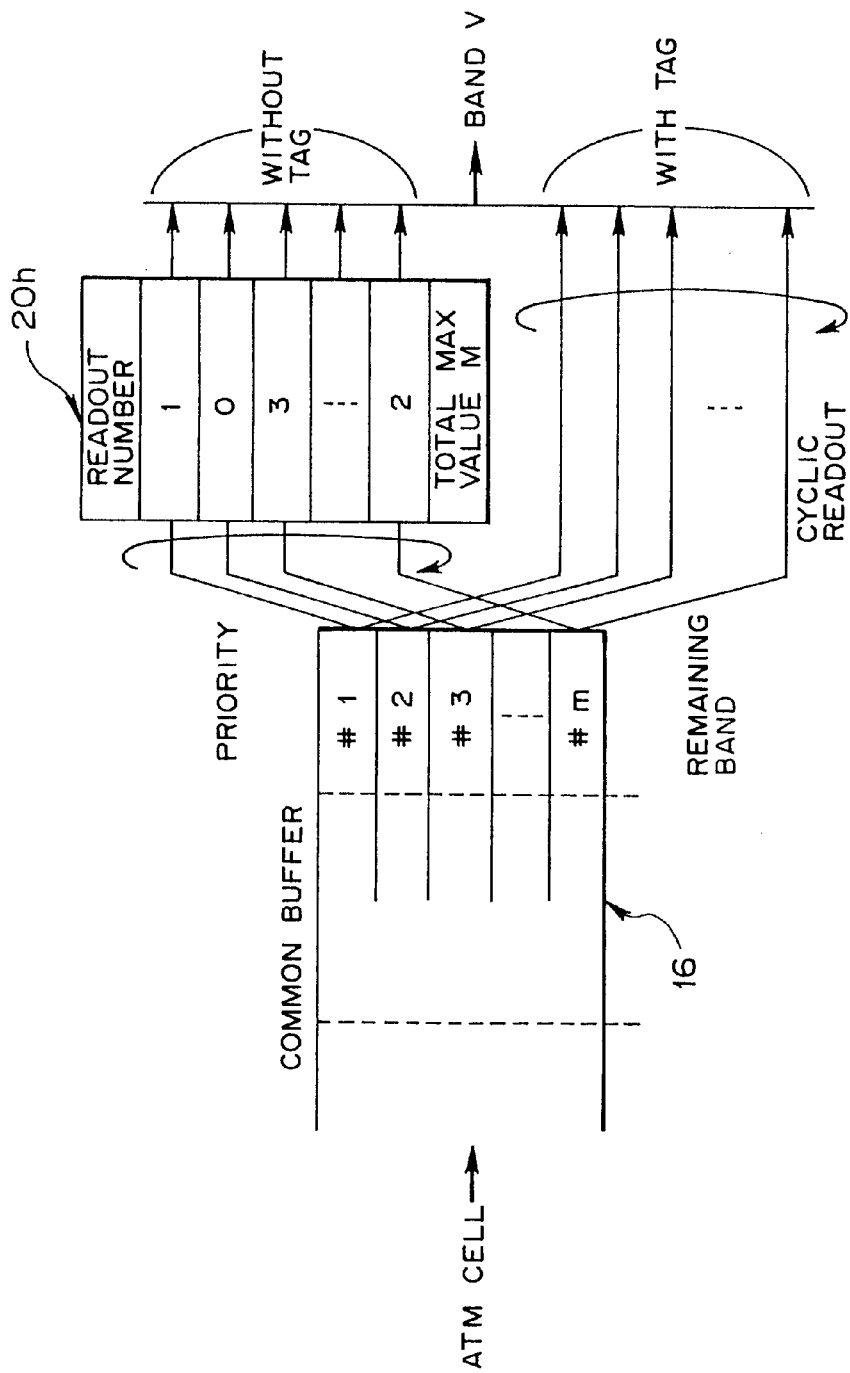
FIG. 28 is a schematic view for explaining an operation of the readout control section in the eighth modified example.

In thus configured readout control section 22 in this modified example, as schematically shown in FIG. 28, the tag setting section 55 sets the CLP within the header 56 to "0" in each cell read out from the common buffer 16 by the minimum band guarantee control according to each set value in the table 20h, so that this cell is transmitted (as a priority cell) without loss; whereas, for each cell cyclically read out by the amount corresponding to the excess band remaining after the minimum band guarantee control, the CLP within the header 56 is set to "1" so as to turn it to a non-priority cell.

Namely, the readout control section 22 gives a higher priority to the cells read out from the common buffer 16 according to each setting of the table 20h than the other cells that are cyclically read out.

Consequently, a higher priority can be given to the cells corresponding to the band to be minimally guaranteed, so that they are not discarded during processing, whereby this modified example greatly contributes to improving the reliability in the minimum band guarantee control.

The above-mentioned tag setting control is also applicable to the readout control section 22 previously explained with reference to FIGS. 19 and 20. Namely, in this case, the CLP is set to "0" in each cell read out in the minimum band guarantee control according to the table 20h, whereas the CLP is set to "1" in each cell read out in the additional readout control according to the table 20j.

(9) Explanation of Ninth Modified Example of Readout Control Section 22

Figure 30:
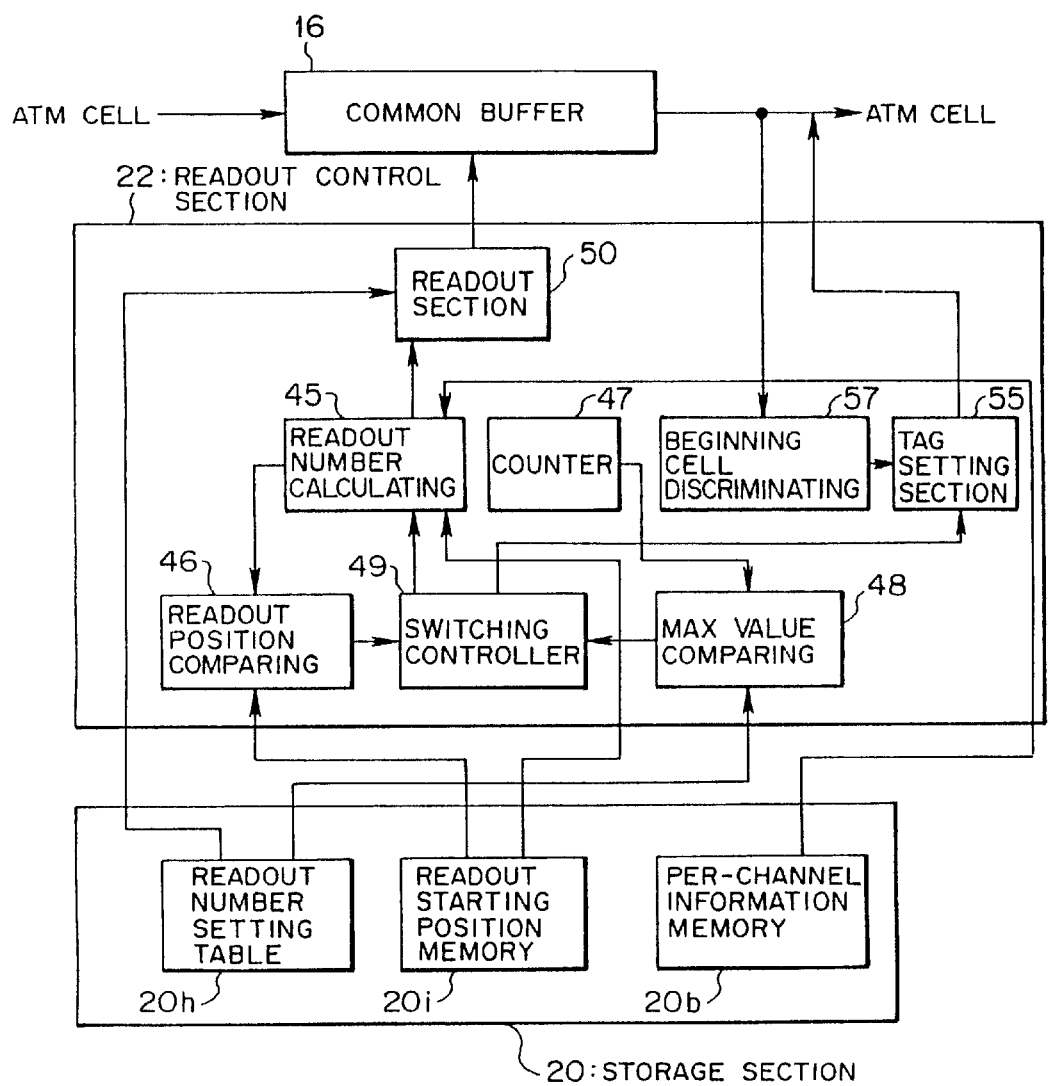
FIG. 30 is a block diagram showing a ninth modified example of the readout control section in the above-mentioned embodiment.

FIG. 30 is a block diagram showing a ninth modified example of the readout control section 22. As shown in this drawing, the readout control section 22 of the ninth modified example further comprises a leading cell discriminating section 57 in addition to the configuration of the readout control section 22 previously mentioned with reference to FIG. 27.

The leading cell detecting section 57 detects whether or not a cell read out from the common buffer 16 is a leading cell of a packet of a higher layer. In this modified example, when the leading cell detecting section 57 detects a leading cell during the minimum band guarantee control, the tag setting section 55 sets the CLP to "0" within the header 56 of this leading cell [see FIGS. 29(a) and 29(b)], and also sets the CLP to "0" within the header 56 of the cells (dependent data) belonging to the same packet as the leading cell.

When the leading cell detecting section 57 detects a leading cell during the cyclic readout control, the tag setting section 55 sets the CLP to "1" within the header 56 of this leading cell, and also sets the CLP to "1" within the header 56 of the cells belonging to the same packet as this leading cell.

In thus configured readout control section 22 in the ninth modified example, when the leading cell detecting section 57 detects a leading cell of a packet in a higher layer in the cells read out from the common buffer 16 during the minimum band guarantee control, the tag setting section 55 sets the CLP to "0" within the header 56 in all the cells belonging to the same packet as this cell, thus giving them no tags.

By contrast, when the leading cell detecting section 57 detects a leading cell during the cyclic readout control, the tag setting section 55 sets the CLP to "1" within the header 56 in all the cells belonging to the same packet as this cell, thus giving them a tag.

Namely, in the case where the cell whose CLP within the header 56 is to be set to "0" so as to give a priority is a leading cell accompanying a dependent cell belonging to the same packet, the CLP within the header 56 is set to "0" for this dependent cell as well, thereby giving it the same priority as the leading cell.

Figure 31:
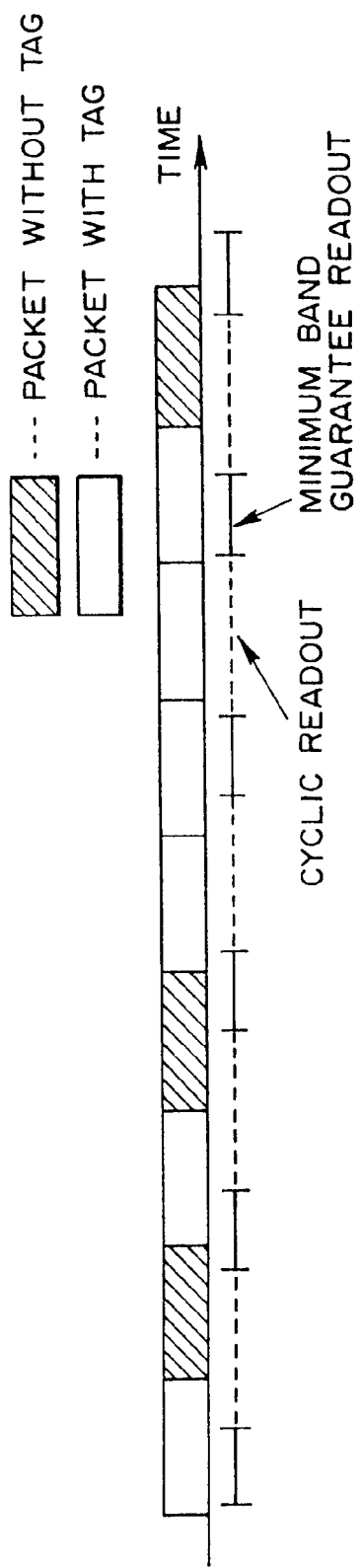
FIG. 31 is a schematic view for explaining an operation of the readout control section in the ninth modified example.

Consequently, the readout control section 22 can perform priority control per packet. For example, when the ratio between the cell readout under the minimum band guarantee control and the cell readout under the cyclic readout control is 1:2, as schematically shown in FIG. 31, the probability of the leading cell of a packet being read out under the minimum band guarantee control is 1/3, whereas the probability of the leading cell of a packet being read out under the cyclic readout control is 2/3, whereby the ratio between the packets with and without tag statistically becomes 1:2.

Thus, in the case where the cell to have a priority is a leading cell accompanying a dependent cell belonging to the same packet, the readout control section 22 gives this dependent cell the same priority as the leading cell, so that the cells within the same packet have the same priority, whereby the priority/non-priority control can be performed quite efficiently.

(10) Explanation of Tenth Modified Example of Readout Control Section 22

Figure 32:
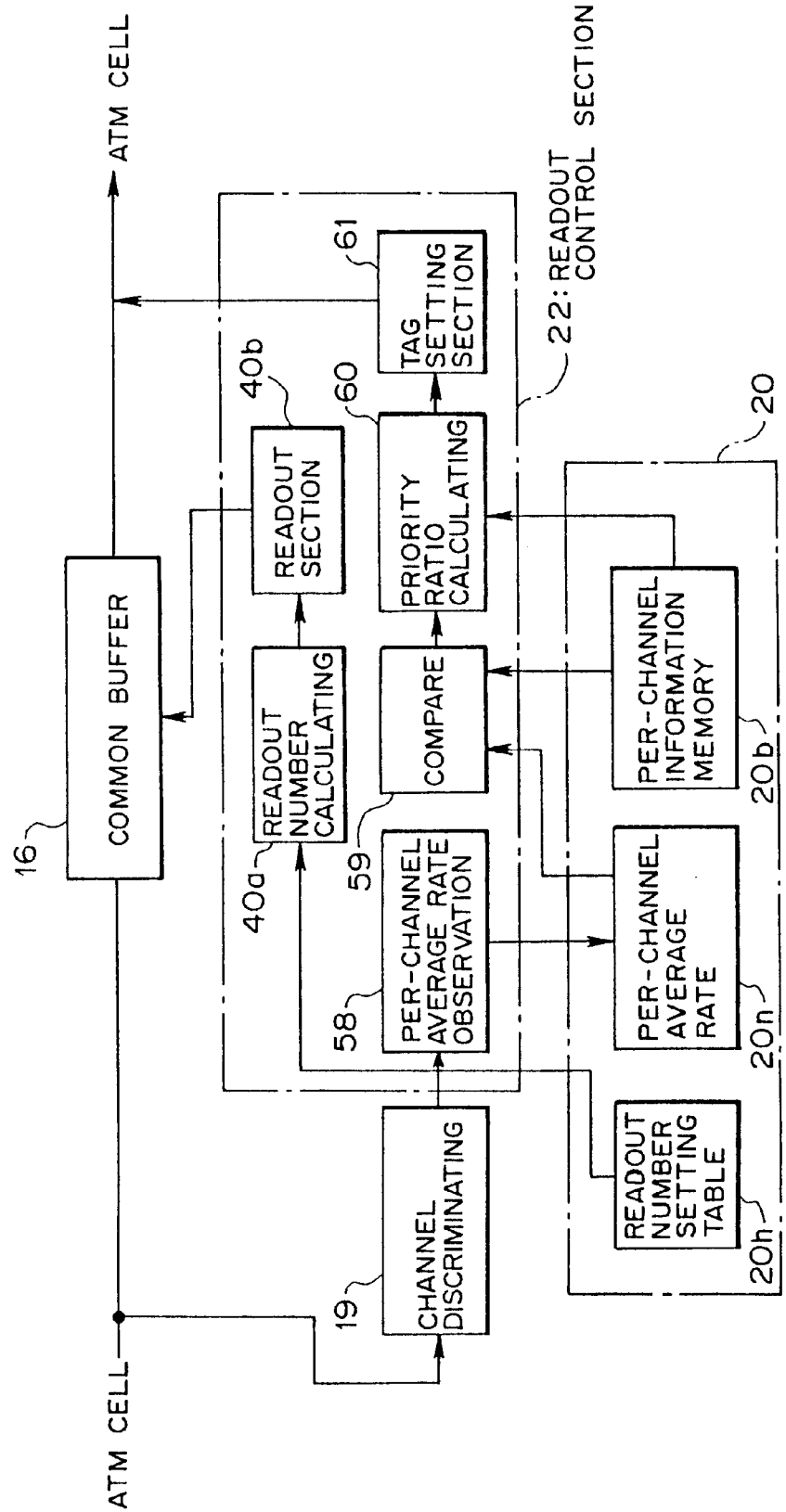
FIG. 32 is a block diagram showing a tenth modified example of the readout control section in the above-mentioned embodiment.

FIG. 32 is a block diagram showing a tenth modified example of the readout control section 22. As shown in this drawing, the readout control section 22 of the tenth modified example comprises not only the readout number calculating section 40a and readout section 40b previously explained with reference to FIG. 13, but also a per-channel average rate observing section 58, a comparing section 59, a priority ratio calculating section 60, and a tag setting section 61. Here, the storage section 20 is provided with a per-channel average rate memory 20n in addition to the per-channel information memory 20b and readout number setting table 20h mentioned above.

The per-channel average rate observation section (received data amount average value detecting section) 58 detects an average value of the amount (rate) of received ATM cells for each channel. In this modified example, it detects a per-channel average rate by sampling the rate of each channel through a jumping window whose unit is the maximum value that can be attained by the sum of set values of all the channels in the table 20h. The average rate obtained by the per-channel average rate observing section 58 is stored in the per-channel average rate memory 20n.

The comparing section 59 compares the average rate detected by the per-channel average rate observing section 58 and stored in the per-channel average rate memory 20n with the corresponding set value (readout number) in the table 20h. When the comparing section 59 judges the average rate to be greater than the set value in the table 20h (i.e., when the average rate is judged to exceed the minimally guaranteed band), the priority ratio calculating section (priority data amount calculating section) 60 calculates, of the cells read out from the common buffer 16 according to the table 20h, the number of priority cells to have a higher priority.

According to the result of calculation in the priority ratio calculating section 60, the tag setting section 61 sets, of the cells readout from the common buffer 16 by the readout number calculating section 40, "0" to the CLP defined in the header 56 of each of cells [see FIGS. 29(a) and 29(b)] corresponding to the number of priority cells, thus giving them a priority. In this modified example, the tag setting section 61 sets the CLP to "1" in the cells other than those corresponding to the priority cell number.

In thus configured readout control section 22 of the tenth modified example, in the case where the per-channel average rate obtained by the per-channel average rate observing section 58 exceeds the minimally guaranteed band, the priority ratio calculating section 60 calculates, of the cells read out from the common buffer 16, the number of priority cells to have a higher priority, and sets the CLP to "0" in each of the cells corresponding to the priority cell number, thereby giving them a higher priority; while setting the CLP to "1" in each of the cells whose rate exceeds the minimally guaranteed band, thereby giving them a lower priority.

Figure 33:
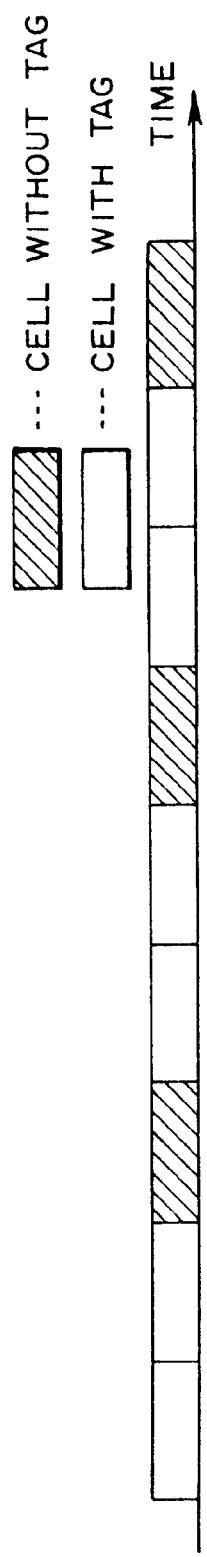
FIG. 33 is a schematic view for explaining an operation of the readout control section in the tenth modified example.

For example, as schematically shown in FIG. 33, in the case where the average rate obtained through the jumping window is three times that of the minimally guaranteed band, the tag setting section 61 sets the CLP to "0" in every 3 cells read out from the common buffer 16, thus giving them no tags. As a result, a higher priority is given to the cells corresponding to the minimally guaranteed band.

Since, of the cells read out by a plurality of numbers under the minimal band guarantee control according to the table 20h, the cells corresponding to the minimally guaranteed band can thus attain a higher priority, the readout control section 22 greatly contributes to improving the reliability of the minimum band guarantee control.

(11) Explanation of Eleventh Modified Example of Readout Control Section 22

Figure 34:
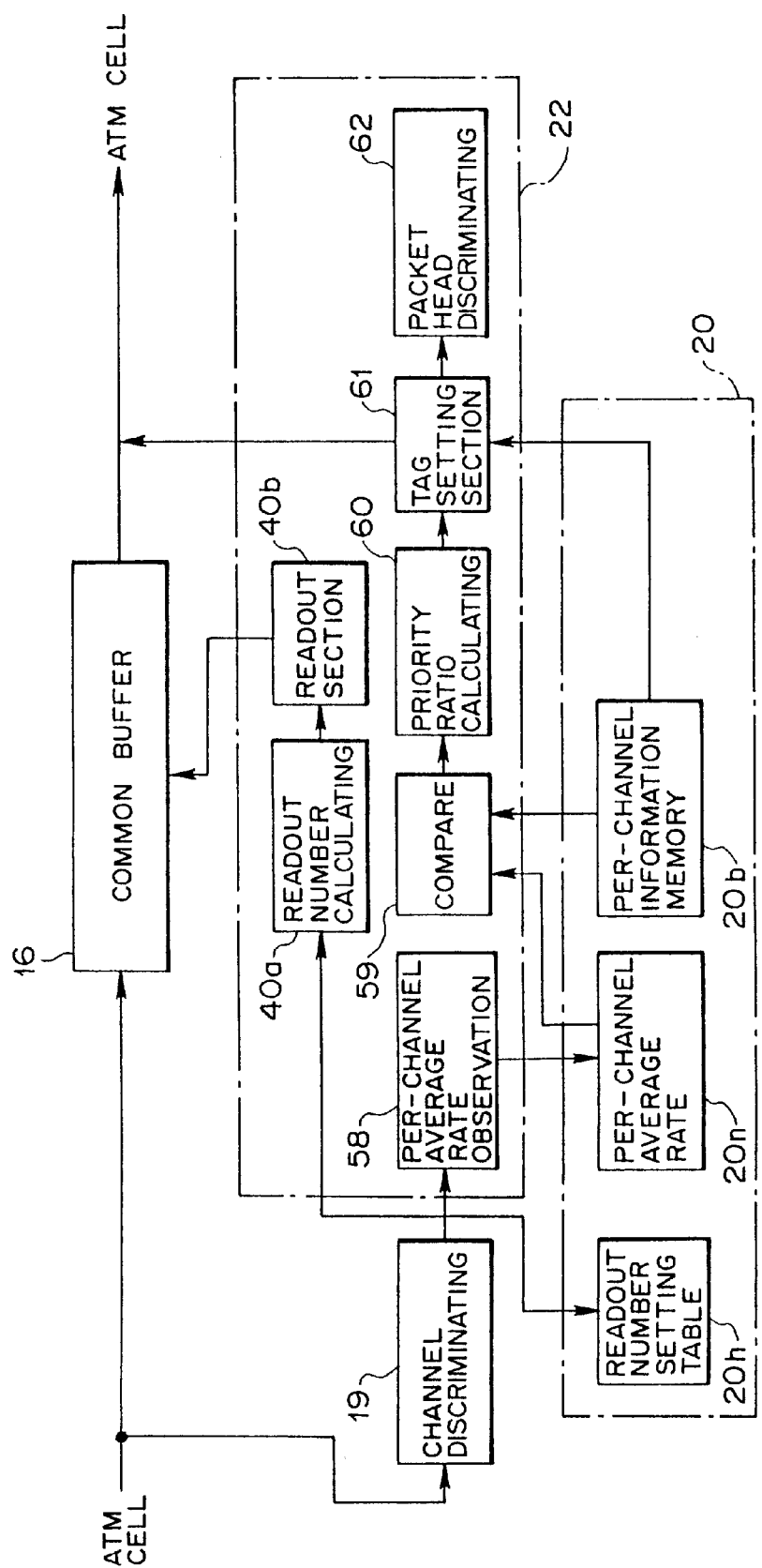
FIG. 34 is a block diagram showing an eleventh modified example of the readout control section in the above-mentioned embodiment.

FIG. 34 is a block diagram showing an eleventh modified example of the readout control section 22. As shown in this drawing, the readout control section 22 in the eleventh modified example further comprises a packet head discriminating section 62 in addition to the readout number calculating section 40, per-channel average rate observing section 58, comparing section 59, priority ratio calculating section 60, and tag setting section 61 shown in FIG. 32.

The packet head discriminating section (leading data discriminating section) 62 judges whether or not a cell to have a priority (whose CLP is to be set to "0") as mentioned above is a leading cell accompanying a dependent cell which belongs to the same packet. When the packet head discriminating section 62 identifies a leading cell, the tag setting section 61 sets the CLP to "0" in each cell belonging to the same packet as the leading cell.

In thus configured readout control section 22 of the eleventh modified example, as explained in the tenth modified example, when the per-channel average rate obtained by the per-channel average rate observing section 58 exceeds the minimally guaranteed band, the priority ratio calculating section 60 calculates, of the cells read out from the common buffer 16, the number of priority cells to have a higher priority.

Also, the tag setting section 61 sets the CLP to "0" in each of the cells corresponding to thus obtained priority cell number, thereby giving them a higher priority; while setting the CLP to "1" in each of the cells whose rate exceeds the minimally guaranteed band, thus giving them a lower priority. Here, the packet head discriminating section 62 judges whether or not the cell whose CLP has thus set CLP is a leading cell of a packet; and, when the cell with thus set CLP is the leading cell of a packet, controls the tag setting section 62 so that the CLP of each dependent cell belonging to this packet becomes identical to that of the leading cell.

Namely, when the CLP of the leading cell is set to "0" by the tag setting section 61, the CLP is set to "0" in each of its dependent cells; whereas, when the CLP of the leading cell is set to "1," the CLP is set to "1" in each of its dependent cells.

Figure 35:
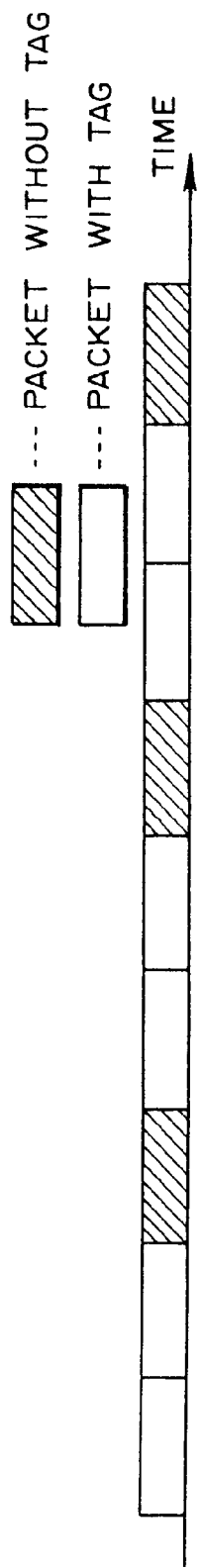
FIG. 35 is a schematic view for explaining an operation of the readout control section in the eleventh modified example.
Figure 36:
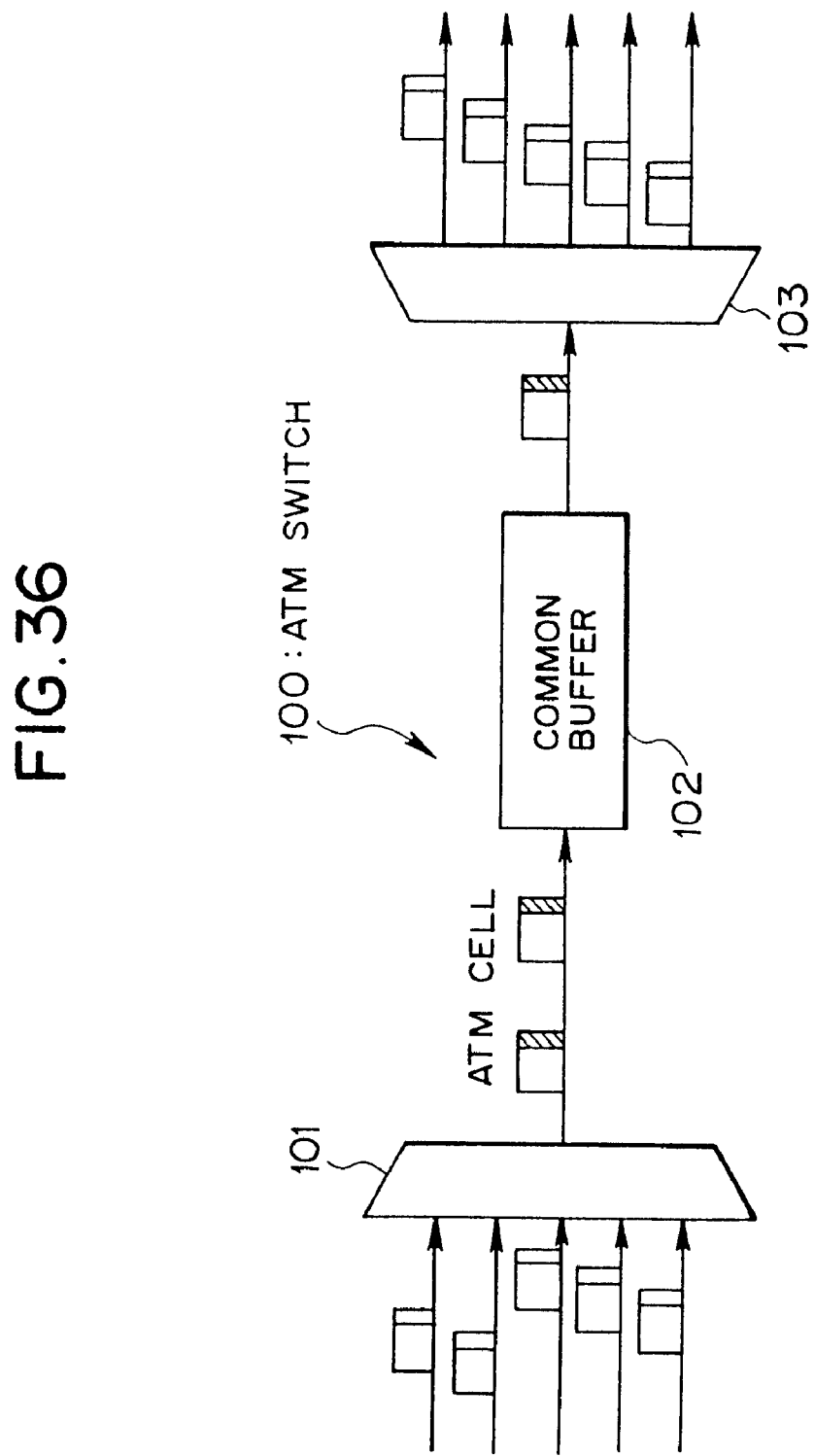
FIG. 36 is a block diagram for explaining a common buffer system.
Figure 37:
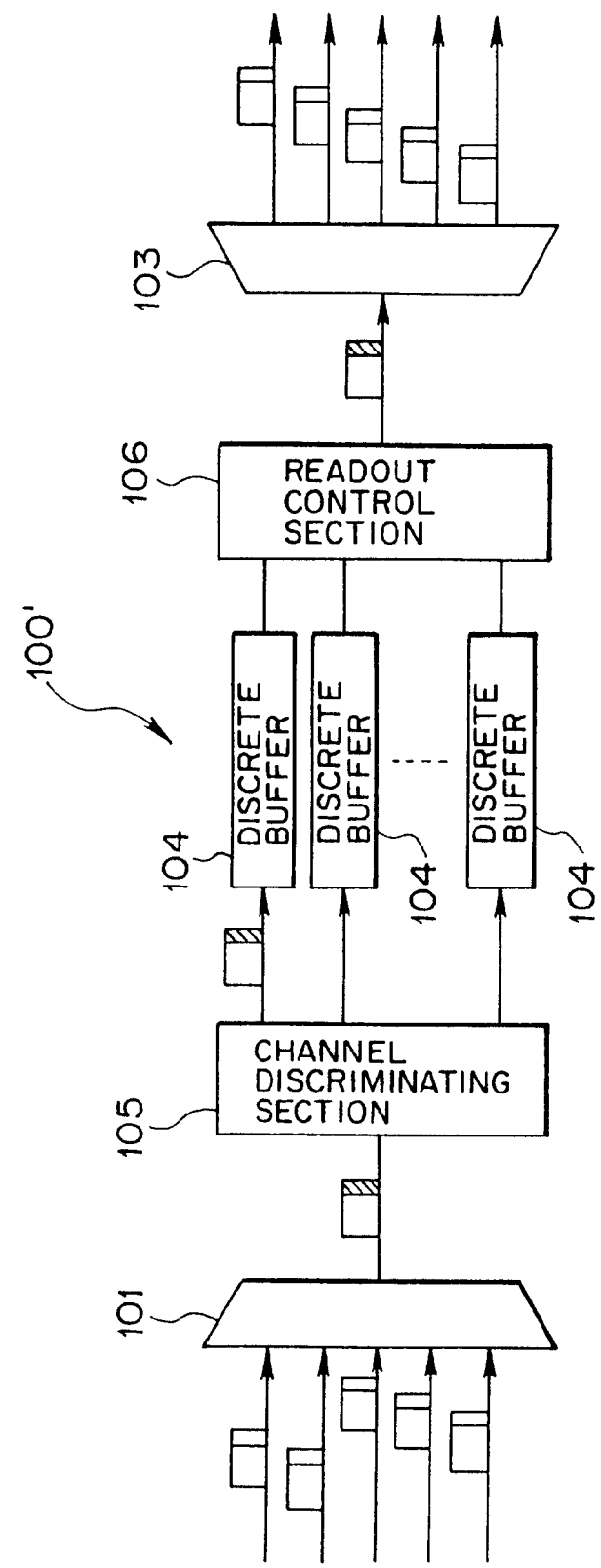
FIG. 37 is a block diagram for explaining a discrete buffer system.

For example, in the case where the average rate obtained through the jumping window is three times that of the minimally guaranteed band, as schematically shown in FIG. 35, the tag setting section 61 sets the CLP of all the cells to "0" in every three packets read out from the common buffer 16, thus giving them no tags. As a result, a higher priority is given to the cells corresponding to the minimally guaranteed band. Namely, with respect to the cells whose rate exceeds the minimally guaranteed band which are obtained through the jumping window, the readout control section 22 causes cells belonging to the same packet to have the same value of priority so as to give a tag per packet, thus enabling priority control per packet.

Accordingly, also in this case, priority can be efficiently set to the cells read out from the common buffer 16 for each packet formed by a leading cell and dependent cells.

Though the foregoing embodiments are explained in terms of ATM cell as an example of received data, without being restricted thereto, the present invention is also applicable to various kinds of data other than ATM cell.

Also, without being restricted to the above-mentioned embodiments, the present invention can be realized as being modified in various manners as long as it does not deviate from the scope of the present invention.

What is claimed is:

1. A buffer control apparatus for controlling storage process for a common buffer, which is commonly used for a plurality of channels and temporarily stores data received from said channels, said buffer control apparatus comprising:
   a route discriminating section for identifying the individual channels of said received data based on a channel identifier stored in said received data;
   a storage section for storing at least information concerning a stored position of said received data within said common buffer of said received data within said common buffer for the individual channels; and
   a control section for performing a control operation for storing received data into said common buffer and managing the stored position of said received data in said common buffer for the individual channels based on a result of channel identification in said route discriminating section and said information concerning the stored position in said storage section:

wherein said storage section comprises:
   a link memory for storing, for each route, a series of address information of said received data within said common buffer as being successively linked in an order of said received data,
   a per-route information memory for storing, for each route, the address information of the received data initially stored in said common buffer, the address information of the received data lastly stored in said common buffer, and an amount of the received data, and
   an empty address information memory for storing empty address information within said common buffer; and wherein, according to the result of route identification in said route discriminating section and the empty address information in said empty address information memory, said control section causes the received data to be stored at a predetermined empty address in said common buffer and, based on said empty address, updates each of the linking state in said link memory, the address information and the amount of received data in said per-route information memory, and the empty address information in said empty address information memory;

a threshold storing section for storing a threshold value concerning a congested state in said common buffer;

wherein said control section comprises:
   a congested state detecting section for detecting said congested state of said common buffer according to said threshold value of said threshold storing section, and
   a storage processing restricting section which can restrain, for each route, said received data from being stored into said common buffer when said congested state detecting section detects said contested state;

wherein said threshold storing section comprises a total data amount threshold storing section for storing a total data amount threshold value concerning a total data amount within said common buffer, and a minimally-guaranteed threshold storing section for storing a minimally-guaranteed threshold value for an amount of data to be minimally guaranteed for each route within said common buffer;
   wherein said congested state detecting section comprises a total data mount evaluating section for judging whether the total data amount within said common buffer exceeds said total data threshold value or not,
   said congested state detecting section being configured so as to detect said congested state when said total data amount evaluating section judges the total data amount within said common buffer to be higher than said total data amount threshold value; and
   wherein said storage processing restricting section comprises a per-route data amount evaluating section for judging, when said congested state detecting section detects said congested state, whether or not there exists within said common buffer a route whose per-route data amount exceeds said minimally guaranteed threshold value,
   said storage processing restricting section being configured to restrain, when said per-route data amount evaluating section judges that there is a route exceeding said minimally guaranteed threshold value, new received data from being stored into said common buffer for said route;

wherein said storage processing restricting section is configured such that, even when said congested state detecting section detects a congested state whereby new received data are restrained from being stored into said common buffer for a certain route, dependent data which form a single data together with the received data already stored in said common buffer for the are all owed to be stored into said common buffer.

2. A buffer control apparatus for controlling storage process for a common buffer, which is commonly used for a plurality of channels and temporarily stores data received from said channels, said buffer control apparatus comprising:

a route discriminating section for identifying the individual channels of said received data based on a channel identifier stored in said received data;

a storage section for storing at least information concerning a stored position of said received data within said common buffer for the individual channels;

a control section for performing a control operation for storing received data into said common buffer and managing the stored position of said received data in said common buffer for the individual channels based on a result of channel identification in said roue discriminating section and said information concerning the stored position in said storage section, wherein said storage section comprises:

a link memory for storing, for each route, a series of address information of said received data within said common buffer as being successively linked in an order of said received data, a per-route information memory for storing, for each route, the address information of the received data initially stored in said common buffer, the address information of the received data lastly stored in said common buffer, and an amount of the received data, and an empty address information memory for storing empty address information within said common buffer, and wherein, according to the result of route identification in said route discriminating section and the empty address information in said empty address information memory, said control section causes the received data to be stored at a predetermined empty address in said common buffer and, based on said empty address, updates each of the linking state in said link memory, the address information and the amount of received data in said per-route information memory, and the empty address information in said empty address information memory;

a threshold storing section for storing a threshold value concerning a congested state in said common buffer;

wherein said control section comprises:

a congested state detecting section for detecting said congested state of said common buffer according to said threshold value of said threshold storing section, and a storage processing restricting section which can restrain, for each route, said received data from being stored into said common buffer when said congested state detecting section detects said congested state, wherein said threshold storing section comprises an active route number threshold storing section for storing an active route number threshold value concerning a number of routes in an active state receiving data, and a minimally-guaranteed threshold storing section for storing a minimally-guaranteed threshold value for an amount of data to be minimally guaranteed for each route within said common buffer, wherein said congested state detecting section comprises an active route number evaluating section for judging whether said number of routes in the active state exceeds said active route number threshold value or not, said congested state detecting section being configured so as to detect said congested state when said active route number evaluating section judges said number of routes in the active state to be higher than said active route number threshold value; and wherein said storage processing restricting section comprises a per-route data amount evaluating section for judging, when said congested state detecting section detects said congested state, whether or not there exists within said common buffer a route whose per-route data amount exceeds said minimally guaranteed threshold value, said storage processing restricting section being configured to restrain, when said per-route data amount evaluating section judges that there is a route exceeding said minimally guaranteed threshold value, new received data from being stored into said common buffer for said route, wherein said storage processing restricting section is configured such that, even when said congested state detecting section detects a congested state whereby new received data are restrained from being stored into said common buffer for a certain route, dependent data which form a single data together with the received data already stored in said common buffer for the certain route are allowed to be stored into said common buffer.

3. A buffer control apparatus for controlling storage process for a common buffer, which is commonly used for a plurality of channels and temporarily stores data received from said channels, said buffer control apparatus comprising:

a route discriminating section for identifying the individual channels of said received data based on a channel identifier stored in said received data;

a storage section for storing at least information concerning a stored position of said received data within said common buffer of said received data within said common buffer for the individual channels: and a control section for performing a control operation for storing received data into said common buffer and managing the stored position of said received data in said common buffer for the individual channels based on a result of channel identification in said route discriminating section and said information concerning the stored position in said storage section, wherein said control section comprises a readout control section reading out said received data virtually stored in said common buffer for the respective routes according to said information concerning the storing position in said storing section, wherein said readout control section comprises a retrieving section for retrieving a route of the received data to be read out from said common buffer; and wherein said retrieving sections skips retrieving for the routes in which said received data to be read out do not exist.

4. The buffer control apparatus of claim 3, wherein said retrieving section comprises:
a group retrieving section for dividing said routes into a plurality of groups and retrieving a group in which said received data to be read out from said common buffer exist, and
a route retrieving section for retrieving a route of the received data to be read out from said common buffer within said group retrieved by said group retrieving section.

5. A buffer control apparatus for controlling storage process for a common buffer, which is commonly used for a plurality of channels and temporarily stores data received from said channels,
said buffer control apparatus comprising:
a route discriminating section for identifying the individual channels of said received data based on a channel identifier stored in said received data;
a storage section for storing at least information concerning a stored position of said received data within said common buffer of said received data within said common buffer for the individual channels; and
a control section for performing a control operation for storing received data into said common buffer; and managing the stored position of said received data in said common buffer for the individual channels based on a result of channel identification in said route discriminating section and in said information concerning the stored position in said storage section,
wherein said control section comprises a readout control section for reading out said received data virtually stored in said common buffer for the respective routes according to said information concerning the storing position in said storing section,
wherein said storage section comprises a first readout data setting section for setting a first readout data to be read out from said common buffer for each route,
wherein said readout control section is configured so as to read out said received data from said common buffer for each route according to each first readout data amount of said first readout data amount setting section,
wherein, after performing the readout control for all the routes according to the respective first readout data amounts in said first readout data amount setting section in said storage section, said readout control section cyclically reads out said received data from said common buffer by a constant data amount for each route,
wherein said readout control section comprises a timer for outputting a data readout timing at a predetermined interval for each first setting data amount in said first readout data amount setting section; and
wherein said received data corresponding to each first readout data amount of said first readout data amount setting section is read out from said common buffer for each route according to timimg of said timer.

6. A buffer control apparatus for controlling storage process for a common buffer, which is commonly used for a plurality of channels and temporarily stores data received from said channels,
said buffer control apparatus comprising:
a route discriminating section for identifying the individual channels of said received data based on a channel identifier stored in said received data;
a storage section for storing at least information concerning a stored position of said received data within said common buffer of said received data within said common buffer for the individual channels; and
a control section for performing a control operation for storing received data into said common buffer and managing the stored position of said received data in said common buffer for the individual channels based on a result of channel identification in said route discriminating section and said information concerning the stored position in said storage section,
wherein said control section comprises a readout control section for reading out said received data virtually stored in said common buffer for the respective routes according to said information concerning the storing position in said storing section,
wherein said storage section comprises a first readout data setting section for setting a first readout data to be read out from said common buffer for each route; and
wherein said readout control section is configured so as to read out said received data from said common buffer for each route according to each first readout data amount of said first readout data amount setting section,
wherein said storage section comprises a second readout data amount setting section for setting a second readout data amount to be read out from said common buffer such that a sum of said second readout data amount and said first readout data amount becomes identical in all the routes,
wherein, after performing the readout control of the received data from said common buffer for all the routes according to the respective first readout data amounts of said first readout data amount setting section, said readout control section reads out said received data from said common buffer for each route according to each second readout data amount of said second readout data amount setting section,
wherein said readout control section comprises a timer for outputting a data readout timing at a predetermined interval for each first setting data amount in said first readout data amount setting section, and
wherein said received data corresponding to each first readout data amount of said first readout data amount setting section is read out from said common buffer for each route according to said timing of said timer.

7. A buffer control apparatus for controlling storage process for a common buffer, which is commonly used for a plurality of channels and temporarily stores data received from said channels,
said buffer control apparatus comprising:
a route discriminating section for identifying the individual channels of said received data based on a channel identifier stored in said received data;
a storage section for storing at least information concerning a stored position of said received data within said common buffer of said received data within said common buffer for the individual channels; and
a control section for performing a control operation for storing received data into said common buffer and managing the stored position of said received data in said common buffer for the individual channels based on a result of channel identification in said route discriminating section and said information concerning the stored position in said storage section, wherein said control section comprises a readout control section for reading out said received data virtually stored in said common buffer for the respective routes according to said information concerning the storing position in said storing section, wherein said storage section comprises a first readout data setting section for setting a first readout data to be read out from said common buffer for each route; and wherein said readout control section is configured so as to read out said received data from said common buffer for each route according to each first readout data amount of said first readout data amount setting section, wherein said storage section comprises a second readout data amount setting section for setting a second readout data amount to be read out from said common buffer such that a sum of said second readout data amount and said first readout data amount becomes identical in all the routes, wherein, after performing the readout control of the received data from said common buffer for all the routes according to the respective first readout data amounts of said first readout data amount setting section, said readout control section reads out said received data from said common buffer for each route according to each second readout data amount of said second readout data amount setting section, wherein said readout control section is configured so as to give a higher priority to the received data read out from said common buffer according to said first readout data amount of said first readout data amount setting section than the other received data, and wherein, when the received data to which said priority is to be given is a leading data accompanying a dependent data, said priority is also given to said dependent data.

8. A buffer control apparatus for controlling storage process for a common buffer, which is commonly used for a plurality of channels and temporarily stores data received from said channels, said buffer control apparatus comprising:

a route discriminating section for identifying the individual channels of said received data based on a channel identifier stored in said received data;

a storage section for storing at least information concerning a stored position of said received data within said common buffer of said received data within said common buffer for the individual channels; and a control section for performing a control operation for storing received data into said common buffer and managing the stored position of said received data in said common buffer for the individual channels based on a result of channel identification, said route discriminating section and said information concerning the stored position in said storage section, wherein said control section comprises a readout control section for reading out said received data virtually stored in said common buffer for the respective routes according to said information concerning the storing position in said storage section, wherein said storage section comprises a first readout data section for setting a first readout data to be read out from said common buffer for each route, wherein said readout control section is configured so as to read out said received data from said common buffer for each route according to each first readout data amount of said first readout data amount setting section, wherein said readout control section comprises a timer for outputting a data readout timing at a predetermined interval for each first setting data amount in said first readout data amount setting section, and wherein said received data corresponding to each first readout data amount of said first readout data amount setting section is read out from said common buffer for each route according to said timing of said timer.

9. The buffer control apparatus of claim 8, wherein said first readout data amount of said first readout data amount setting section is adapted to be set externally.

10. A buffer control apparatus for controlling storage process for a common buffer which is commonly used for a plurality of channels and temporarily stores data received from said channels.

said buffer control apparatus comprising:

a route discriminating section for identifying the individual channels of said received data based on a channel identifier stored in said received data;

a storage section for storing at least information concerning a stored position of said received data within said common buffer of said received data within said common buffer for the individual channels; and a control section for performing a control operation for storing received data into said common buffer and managing the stored position of said received data in said common buffer for the individual channels based on a result of channel identification in said route discriminating section and said information concerning the stored position in said storage section, wherein said control section comprises a readout control section for reading out said received data virtually stored in said common buffer for the respective routes according to said information concerning the storing position in said storing section, wherein said storage section comprises a first readout data setting section for setting a first readout data to be read out from said common buffer for each route, wherein said readout control section is configured so as to read out said received data from said common buffer for each route according to each first readout data amount of said first readout data amount setting section, and wherein said readout control section comprises:

an average received data amount detecting section for detecting an average value of the received data amount for each route, a comparing section for comparing said average value detected by said average received data amount detecting section and corresponding first readout data amount of said first readout data amount setting section with each other, and a priority data amount calculating section for calculating, of said readout data amount, an amount of priority data to have a priority higher than that of the other data;

said readout control section being configured to give, of the received data read out from said common buffer, according to a result of the calculation in said priority data amount calculating section, a priority to the received data corresponding to said priority data amount.

11. The buffer control apparatus of claim 10, wherein said readout control section comprises a leading data discriminating section for judging whether or not the received data to which said priority is given is a leading data accompanying a dependent data; and wherein, when said leading data discriminating section judges the received data to be a leading data to which said priority is to be given, said priority is also given to said dependent data.

12. A buffer control method for controlling storage process for a common buffer, which is commonly used for a plurality of channels and temporarily stores data received from said channels, said method comprising the steps of:
storing received data into said common buffer; and
managing the stored position of said received data in said common buffer for the individual channels,
wherein, when said common buffer attains a congested state, said received data are restrained from being stored into said common buffer for each of said routes, and
when a number of active routes in which data arrived in said common buffer exceeds a predetermined number whereby said common buffer attains said congested state, new received data are restrained from being stored into said common buffer for a route whose data amount exceeds a minimum data amount to be guaranteed within said common buffer, and
wherein, even when new received data are restrained from being stored into said common buffer for a certain route, dependent data which form a single data together with said received data already stored in said common buffer for the certain route are allowed to be stored into said common buffer.

13. A buffer control method for controlling storage process for a common buffer, which is commonly used for a plurality of channels and temporarily stores data received from said channels, said method comprising the steps of:
storing received data into said common buffer; and
managing the stored position of said received data in said common buffer for the individual channels,
wherein said received data stored in said common buffer for the respective routes are read out at a predetermined cycle for each route, and
wherein, in order to read out said received data stored, route by route, in said common buffer, when retrieving said routes of said received data, retrieval is skipped for the routes in which no received data to be read out exist.

14. The buffer control method of claim 13, wherein, when retrieving the route of the received data to be read out from said common buffer, said routes are divided into a plurality of groups, and, after a group including the route in which said received data exist is retrieved, the route in which said received data exist is retrieved within thus retrieved group.

15. A buffer control method for controlling storage process for a common buffer, which is commonly used for a plurality of channels and temporarily stores data received from said channels, said method comprising the steps of:
storing received data into said common buffer; and
managing the stored position of said received data in said common buffer for the individual channels,
wherein said received data stored in said common buffer are read out for each route by a predetermined amount,
wherein, after said received data stored in said common buffer are read out for each route by a predetermined amount, said received data are cyclically read out from said common buffer by a constant data amount, and wherein each of said received data read out by said predetermined amount is read out at a predetermined interval.

16. A buffer control method for controlling storage process for a common buffer, which is commonly used for a plurality of channels and temporarily stores data received from said channels, said method comprising the steps of:
storing received data into said common buffer; and
managing the stored position of said received data in said common buffer for the individual channels,
wherein said received data stored in said common buffer are read out for each route by a predetermined amount,
wherein said received data stored in said common buffer are read out for each route by a predetermined amount,
wherein, after said received data stored in said common buffer are read out for each route by a predetermined amount, said received data are cyclically read out from said common buffer by a constant data amount,
wherein a higher priority is given to said received data read out by said predetermined amount than the other received data, and
wherein, when the received data to which said priority is to be given is a leading data accompanying a dependent data, said priority is also given to said dependent data.

17. A buffer control method for controlling storage process for a common buffer, which is commonly used for a plurality of channels and temporarily stores data received from said channels, said method comprising the steps of:
storing received data into said common buffer; and
managing the stored position of said received data in said common buffer for the individual channels,
wherein said received data stored in said common buffer are read out for each route by a predetermined amount,
wherein, after said received data stored in said common buffer are read out for each route by a predetermined amount, said received data are further read out from said common buffer by a predetermined amount such that a total readout data amount for each route becomes identical for all the routes, and
wherein each of said received data readout by said predetermined amount is read out at a predetermined interval.

18. A buffer control method for controlling storage process for a common buffer, which is commonly used for a plurality of channels and temporarily stores data received from said channels, said method comprising the steps of:
storing received data into said common buffer; and
managing the stored position of said received data in said common buffer for the individual channels,
wherein said received data stored in said common buffer are read out for each route by a predetermined amount,
wherein, after said received data stored in said common buffer are read out for each route by a predetermined amount, said received data are further read out from said common buffer by a predetermined amount such that a total readout data amount for each route becomes identical for all the routes,
wherein a higher priority is given to said received data read out by said predetermined amount than the other received data, and wherein, when the received data to which said priority is to be given is a leading data accompanying a dependent data, said priority is also given to said dependent data.

19. A buffer control method for controlling storage process for a common buffer, which is commonly used or a plurality of channels and temporarily stores data received from said channels, said method comprising the steps of:
storing received data into said common buffer; and
managing the stored position of said received data in said common buffer for the individual channels,
wherein said received data stored in said common buffer are read out for each route by a predetermined amount, and
wherein, when an average value of received data amount for each route is greater than the received data amount read out by said predetermined amount, of said received data amount, a priority data amount to have a priority higher than the other data is calculated, and, according to a result of the calculation, the priority is given at a predetermined ratio to the received data read out from said common buffer.

20. The buffer control method of claim 19, wherein, when the received data to have said priority is a leading data accompanying a dependent data, said priority is also given to said dependent data.

* * * * *